(12) United States Patent
Lee

(10) Patent No.: US 11,442,879 B2
(45) Date of Patent: Sep. 13, 2022

(54) INTERRUPT REQUEST PROCESSING DEVICE

(71) Applicant: Foundation of Soongsil University-Industry Cooperation, Seoul (KR)

(72) Inventor: Chanho Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 92 days.

(21) Appl. No.: 17/143,183

(22) Filed: Jan. 7, 2021

(65) Prior Publication Data

US 2022/0214984 A1    Jul. 7, 2022

(51) Int. Cl.
*G06F 13/24* (2006.01)

(52) U.S. Cl.
CPC ................... *G06F 13/24* (2013.01)

(58) Field of Classification Search
CPC ....................................... G06F 13/24
See application file for complete search history.

(56) References Cited

U.S. PATENT DOCUMENTS

| | | | |
|---|---|---|---|
| 2002/0029358 A1* | 3/2002 | Pawlowski | G06F 11/0724 714/39 |
| 2002/0184423 A1* | 12/2002 | Khan | G06F 13/26 710/260 |
| 2004/0177192 A1* | 9/2004 | Pezzini | G06F 13/26 710/260 |
| 2014/0006668 A1* | 1/2014 | Chew | G06F 13/24 710/269 |
| 2016/0283283 A1* | 9/2016 | Jung | H04L 67/1004 |
| 2020/0242058 A1* | 7/2020 | Lin | G06F 13/24 |
| 2021/0117229 A1* | 4/2021 | Kraemer | G06F 9/542 |

* cited by examiner

*Primary Examiner* — Phong H Dang

(57) ABSTRACT

According to embodiments, in an interrupt request processing device including one or more peripheral devices, one or more processor interfaces, and one or more processors, when an interrupt request (IRQ) is generated, the peripheral device generates a packet and transmit the packet to the processor interface via an on-chip network, the processor interface receives and decodes the packet to transmit the IRQ signal to the processor, and receives an interrupt vector generated from the processor to transmit an initial instruction corresponding to an activated interrupt request may transmit to the processor, and the processor outputs the interrupt vector in response to the IRQ signal and executes a corresponding interrupt service routine (ISR).

15 Claims, 14 Drawing Sheets

INTERRUPT REQUEST PROCESSING DEVICE

FIELD AND BACKGROUND OF THE INVENTION

Embodiments of the present invention relate to an interrupt request processing device.

In the conventional processor-based system, unidirectional communication is performed between processors and peripheral devices, and thus efficiency of the system is not high and particularly, when there is a multiprocessor, various problems occur. The processor has a characteristic that operates only as a master due to characteristics thereof. Therefore, it is possible to communicate with the peripheral device, which is a slave, using a polling or interrupt method, but nowadays, the processor has many tasks, so mostly the interrupt method is used.

In the interrupt method, a separate interrupt connection line is required, and when there are multiple peripheral devices, which are slaves, the method additionally goes through an interrupt controller for signal processing. The processor that receives an interrupt signal may check a cause of an interrupt and start an operation corresponding to the cause only when accessing the peripheral device through the interrupt controller. That is, in order to check the interrupt operation to be performed, the processor have to access the peripheral device through the interrupt controller. Therefore, the interrupt has quite high overhead for the operation.

Another problem is that, in a system in which there is a multiprocessor, transmission of an interrupt signal is further complicated and has many constraints. When there are a plurality of processors, a problem occurs in that it is necessary to determine where to transmit an interrupt signal of a slave of a peripheral device that receives a task request. In addition, in the case of a high-performance interface protocol such as the Advanced eXtensible Interface (AXI), there is a problem in that a process of processing an interrupt becomes more complicated because a slave may receive and store multiple requests and process the multiple requests simultaneously or sequentially.

SUMMARY OF THE INVENTION

The present invention is directed to providing an interrupt request processing device capable of processing an interrupt signal through a minimum number of operations.

The present invention is also directed to providing an interrupt request processing device capable of simplifying complex interrupt signal processing for a multiprocessor and increasing efficiency thereof.

According to an aspect of the present invention, there is provided an interrupt request processing device including one or more peripheral devices, one or more processor interfaces, and one or more processors. When an interrupt request (IRQ) signal is generated, the peripheral device generates a packet and transmits the packet to the processor interface via an on-chip network, the processor interface receives and decodes the packet to transmit the IRQ signal to the processor, and receives an interrupt vector generated from the processor to transmit an instruction corresponding to an activated interrupt signal to the processor, and the processor outputs the interrupt vector in response to the IRQ signal and executes a corresponding interrupt service routine (ISR) according to the instruction.

The packet may include interrupt status information and data, and the interrupt status information may include a peripheral device identification (ID) (DID), a priority (PR), a task ID (TID), and the number (NAD) of pieces of attached data.

The processor interface may include an interrupt controller (IC) which receives and decodes the packet and generates the interrupt request packet using an interrupt vector table and information included in the packet, an IC memory including a buffer which stores related information and data, and the interrupt vector table which stores information related to the ISR, an input interface including a data controller which transmits data requested by the processor and data provided by the IC to the processor, an output interface which receives the interrupt vector from the processor to transmit the interrupt vector to the input interface and transmits a request packet to the peripheral device, and a network interface which connects the on-chip network to the processor interface. The processor interface connects the processor and the N-IF, and processes data transmission from the processor and interrupt requests from peripheral devices. N-IF of processor is symmetrical as it have to initiate and respond to communication. When an asymmetric protocol is used, the network interface may include a master interface and a slave interface, and when a symmetric protocol is used, the network interface may include an integrated interface.

The peripheral device may access a memory according to a size of the packet or an instruction of the processor to store all or a part of the packet, and the processor interface may access the memory to read the packet.

When an IRQ signal is generated, the peripheral device may generate a packet using a designated processor ID and transmit the packet to the processor via the on-chip network, the processor may receive the packet and perform an operation corresponding to the IRQ signal, and in a multiprocessor system, when the IRQ signal is a non-designated IRQ signal, the interrupt request processing device may provide an interrupt signal processing method for designating a processor for processing the non-designated IRQ signal using at least one of an interrupt signal processing designation method, a global interrupt distributor method, a non-designated dedicated interrupt signal processing device method, and a daisy chain method of the interrupt request processing device.

In the multiprocessor system, when the IRQ signal of the peripheral device is processed using a designated interrupt signal processing request method, the peripheral device may generate and transmit the packet using a pre-designated processor ID.

In the multiprocessor system, when the IRQ signal is the non-designated IRQ signal, the peripheral device may designate the processor for processing the non-designated interrupt request, or when there is no non-designated dedicated interrupt request processing device, the peripheral device may arbitrarily designate the processor connected to the on-chip network and generate and transmit the packet. The processor may designate the processor for processing the non-designated IRQ signal in consideration of a periodically measured load on the processor. When the peripheral device arbitrarily designates the processor, the peripheral device may arbitrarily designate one of a large number of processors as a frequency of occurrence of the IRQ signal increases, and in order to reduce a load on a specific processor, the processor ID that is designated each time the IRQ signal is generated may be changed. That is, the higher the frequency of IRQ generation, the greater the number of selectable processors should be.

The interrupt request processing device may further include a global interrupt distributor which receives the packet from the peripheral device via the on-chip network and is connected to a plurality of processors to designate a processor for processing the IRQ signal.

In the global interrupt distributor method, the global interrupt distributor may receive a ready signal from the plurality of processor interfaces, designate a processor for processing the IRQ signal in response to the ready signal, and transmit an interrupt request packet to a corresponding processor. In other words, it can select the processor that will perform the IRQ operation from among the processors that sent the ready signal according to a predetermined selection method.

The global interrupt distributor and the processor interface may be connected via the on-chip network or an interrupt packet bus, and the global interrupt distributor may transmit the packet to the designated processor interface via the on-chip network or the interrupt packet bus.

In the non-designated dedicated interrupt request processing device method, a dedicated processor for dedicatedly processing the non-designated IRQ signal among the plurality of processors may be designated in advance and the packet may be transmitted.

A plurality of non-designated dedicated processors may be designated according to a priority, and when non-designated IRQ signals are accumulated, the plurality of non-designated dedicated processors may be allocated according to the priority.

In the daisy chain method, an interrupt packet may be transmitted to all processor interfaces, and each processor interface may sequentially determine whether the non-designated IRQ signal is processed using an enable signal received from a processor interface located at a front end.

When the processor interface includes only a master interface, the IC, the interrupt vector table, and the buffer may be separately configured outside the processor interface and may include a master interface and a slave interface. The peripheral device may generate an IRQ signal to transmit the IRQ signal to the IC, the IC may access the peripheral device through the master interface, fetch a packet in response to the IRQ signal, decode and store the packet, and transmit the IRQ signal to the processor, and the processor interface may receive the interrupt vector generated from the processor, access the IC, fetch an instruction corresponding to an activated interrupt signal and data, transmit the instruction and the data to the processor, and execute the ISR without accessing the peripheral device.

The IC may be implemented to be integrated with the processor interface.

The IC may be implemented as a separate device.

When there is an interrupt waiting, the IC may access the peripheral device during an interrupt waiting time and fetch the packet in response to the IRQ signal.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which.

DESCRIPTION OF SPECIFIC EMBODIMENTS OF THE INVENTION

Figure 1:
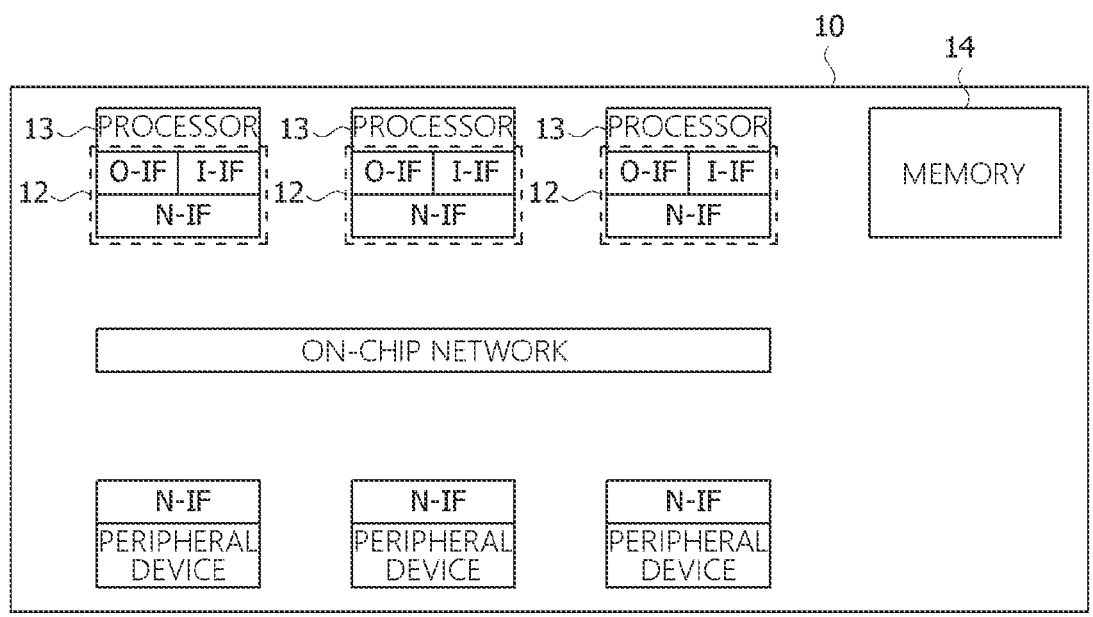
FIG. 1 is a block diagram illustrating a configuration of an interrupt request processing device according to an embodiment of the present invention.

Hereinafter, exemplary embodiments of the present invention will be described in detail with reference to the accompanying drawings.

However, it should be understood that the technical spirit of the present invention is not limited to the embodiments to be disclosed below but may be implemented in many different forms. It should be understood that within the scope of the present invention, one or more elements of each of the embodiments may be selectively combined and substituted.

In addition, the terms (including technical and scientific terms) used in the embodiments of the present invention have the same meaning as commonly understood by one of ordinary skill in the art to which the present invention belongs. It should be further understood that terms, such as those defined in commonly used dictionaries, should be interpreted as having a meaning that is consistent with their meaning in the context of the related art.

Further, the terms used in the embodiments of the present invention are provided only to describe embodiments of the present invention and not for purposes of limitation.

In this specification, the singular forms include the plural forms unless the context clearly indicates otherwise, and the phrase "at least one element (or one or more elements) of an element A, an element B, and an element C," should be understood as including the meaning of at least one of all combinations being obtained by combining the element A, the element B, and the element C.

Further, in describing elements of the present invention, terminologies such as first, second, A, B, (a), and (b) may be used.

The term is used to distinguish an element from another element but a nature, an order, or a sequence of the elements is not limited by the terminology.

It will be understood that when an element is referred to as being "connected" or "coupled" to another element, it can be directly connected or coupled to another element, intervening elements may be present, or it can be connected or coupled to another element through still another element disposed therebetween.

Further, when an element is described as being formed "on (above)" or "under (below)" another element, the term "on (above)" or "under (below)" includes both of a case in which two elements are in direct contact with each other or a case in which one or more elements are (indirectly) disposed between two elements. In addition, the term "on (above)" or "under (below)" includes a case in which another element is disposed in an upward direction or a downward direction with respect to one element.

Hereinafter, the embodiments will be described in detail with reference to the accompanying drawings, the same or corresponding components are denoted by the same reference numerals regardless of reference numbers, and thus the description thereof will not be repeated.

FIG. 1 is a block diagram illustrating a configuration of an interrupt request processing device according to an embodiment of the present invention.

Referring to FIG. 1, an interrupt request processing device 10 according to the embodiment of the present invention may include at least one peripheral device 11, at least one processor interface 12, and at least one processor 13. Each processor interface 12 may include an input interface (I-IF), an output interface (O-IF), and a network interface (N-IF).

In an embodiment, the processor 13 may have a conventional processor structure, transmit processor status information necessary for interrupt processing to the processor interface 12 and be connected to an on-chip network through the processor interface 12 so as to be operated, and the processor 13 and the processor interface 12 may transmit to or receive from data with each other by internal logic thereof. The peripheral device 11 and the processor interface 12 may perform data communication via the on-chip network.

In an embodiment, each of the processor interface 12 and the peripheral device 11 may have a symmetric interface, or perform both master and slave functions. That is, each of the processor interface 12 and the peripheral device 11 may independently initiate communication via the on-chip network. In each of the processor interface 12 and the peripheral device 11, interfaces that are operated independently in an input direction and an output direction may be connected to the on-chip network so that each of the interfaces may serve as both of a master and a slave.

The processor 13 may request a task to the peripheral device 11 and receive a result thereof, or the peripheral device 11 may request a task to the processor 13 by transmitting a packet in the same manner as the processor. An interrupt controller (IC) 22 connected to an input channel of the processor interface 12 may process an input packet to a processor interface. Through the above configuration, unnecessary processes for interrupt processing may be eliminated so that an interrupt operation may be completed with a minimum number of operations.

When an interrupt request (IRQ) signal is generated, the peripheral device 11 may generate a packet and transmit the packet to the processor interface 12 via the on-chip network. This is possible because an I-IF 20 may serve as a slave so that an address may be allocated to the I-IF 20 unlike a conventional system.

When the IRQ signal is a designated IRQ signal, the peripheral device 11 may use a designated processor identification (ID) to generate and transmit a packet.

In an embodiment, the packet may include interrupt status information and data.

The interrupt status information may include a peripheral device ID (DID), a priority (PR), a task ID (TID), and the number (NAD) of pieces of attached data.

TABLE 1

| DID | PR | TID | NAD | Reserved |
|---|---|---|---|---|
| 8 b | 3 b | 4 b | 2 b | 15 b |

Table 1 shows the interrupt status information according to the embodiment. The DID may include a unique number of the peripheral device that generates the packet. The PR may indicate a priority of the interrupt processing, and a specific usage method of the PR may be defined by a system designer as necessary and used. The TID may be defined for the task of the interrupt request and may be used to select a specific interrupt service routine (ISR) for a task in which the interrupt request is generated when the peripheral device may perform two or more different tasks. In the case in which the IC 22 recognizes the DID and the TID, when the processor 13 executes the ISR, the processor interface 12 may recognize only the DID or recognize both the DID and the TID and supply a specific ISR instruction for a corresponding interrupt processing according to a result of the recognition. In the above method, by subdividing a general ISR into multiple specific ISRs and executing only a specific ISR directly, the number of instructions to be executed may be reduced as compared to the case of searching for a required function using a single general ISR, and thus the execution time may be shortened. Alternatively, the IC 22 may not recognize the DID and the TID, and the processor 13 may execute a common ISR, and then perform a necessary task. In this case, the processor 13 may execute the single general ISR to find the specific function and the general ISR may include all the specific functions necessary for all peripherals in addition to a common functions to find the specific function. The NAD may indicate the number of pieces of data included in the packet and may be stored in a common data memory 21 of the I-IF 20. When the processor 13 accesses the peripheral device 11 and requests to read the attached data, a data controller 23 may anticipate the request, check a corresponding address, and then supply pre-stored data of the common data memory 21 to the processor 13 without accessing the peripheral device. Further, the peripheral device 11 may access a memory 14 depending on a size of the packet and store the packet. A description thereof will be described below.

The processor interface 12 may receive and decode the packet to transmit the IRQ signal to the processor 13 and may receive an interrupt vector generated from the processor 13 to transmit an instruction corresponding to an activated interrupt request to the processor 13. Here, the interrupt vector refers to an address in which a code of the ISR is stored or a starting instruction of the ISR.

The processor interface 12 may include the I-IF 20, an O-IF 30, and a N-IF 60.

The I-IF 20 may include an IC memory 70 in which various types of information and data are stored, the IC 22 which receives and decodes the packet and generates an instruction using an interrupt vector table and information included in the packet, and the data controller 23 which performs signal transmission among the N-IF 60, the IC 22 and the processor 13. The IC memory 70 may include an interrupt vector table 24 in which information related to the instructions of the ISR is stored, and the buffer 80 in which various types of related information and data are stored after decoding the packet. The buffer 80 may include an interrupt queue 25 in which the interrupt request of the packet is stored, an interrupt status register 26 in which the interrupt status information is stored, and the common data memory 21 in which the data transmitted from the peripheral device is stored.

The O-IF 30 may receive the interrupt vector from the processor 13 to transmit the received interrupt vector to the I-IF 20 and may transmit a request packet to the peripheral device 11.

The N-IF 60 may connect the on-chip network to the processor interface according to a network protocol used for the system and may include a single interface in the case of a symmetric protocol or may include both a master and a slave interface or only a master interface in the case of an asymmetric protocol.

Further, the processor interface 12 may access the memory 14 to read the data.

The I-IF 20 may receive the packet and decode the packet using the IC 22. Further, the I-IF 20 may store an ID and data of the peripheral device 11 that transmits the packet in the buffer 80 and transmit the IRQ signal to the processor 13. In this case, when there is an interrupt task queuing in the interrupt queue, a newly input interrupt request is stored in the interrupt queue. When the newly input interrupt request is stored in the interrupt queue, a queue order may be changed according to a priority policy.

The O-IF 30 processes a request for the access of the memory and the peripheral device 11 by the processor 13. In the case of an operation related to the interrupt processing, the O-IF 30 directly transmits the required data or instruction to the processor 13 through communication with the I-IF 20 instead of transmitting the packet to the network by searching for an address with respect to the corresponding request.

The processor 13 may receive the IRQ signal to perform an operation corresponding to the IRQ packet.

The processor 13 may output the interrupt vector in response to the IRQ signal and execute a corresponding ISR.

The processor 13 receives the IRQ signal from the I-IF 20 and outputs the interrupt vector. Thereafter, the processor 13 may perform a task related to the IRQ signal according to the instruction received from the data controller 23.

Figure 2:
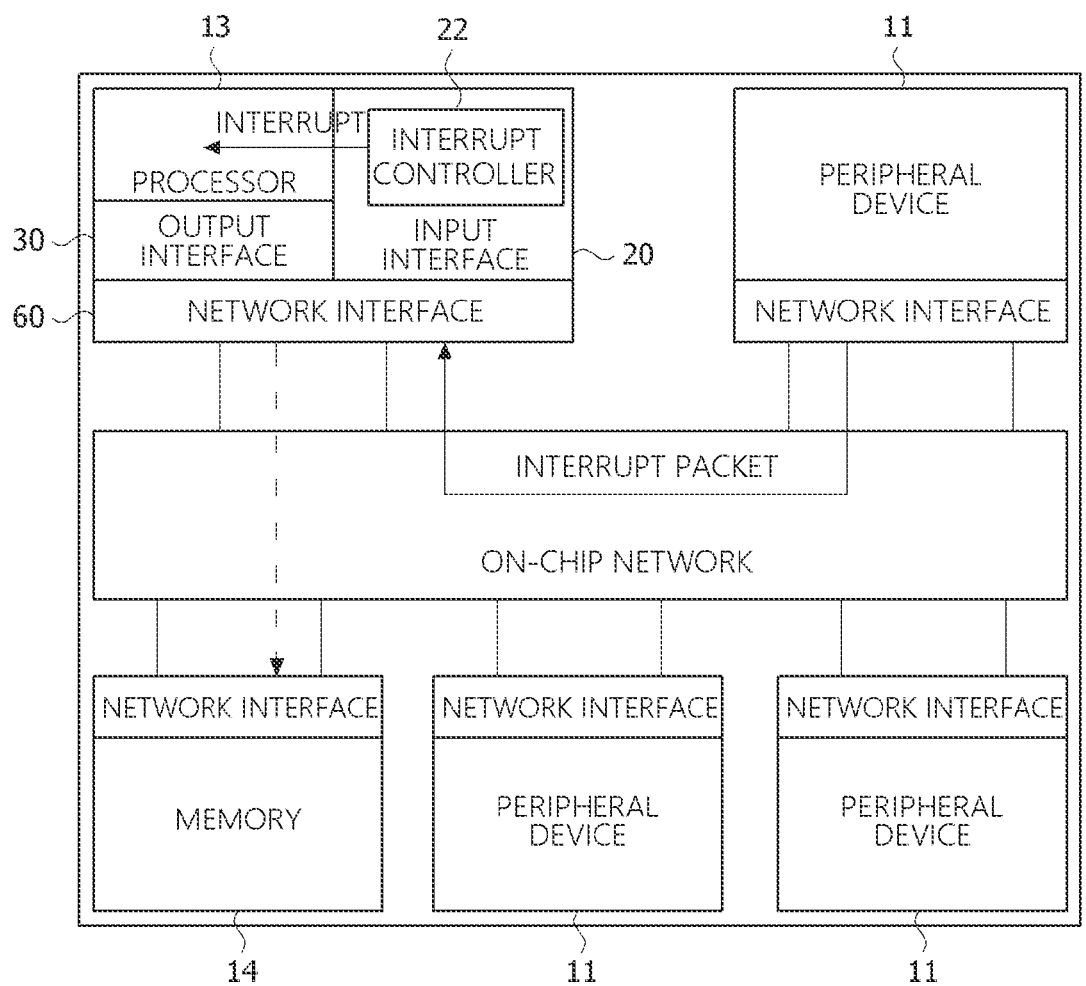
FIG. 2 is a diagram for describing an operation of the interrupt request processing device according to the embodiment of the present invention.
Figure 3:
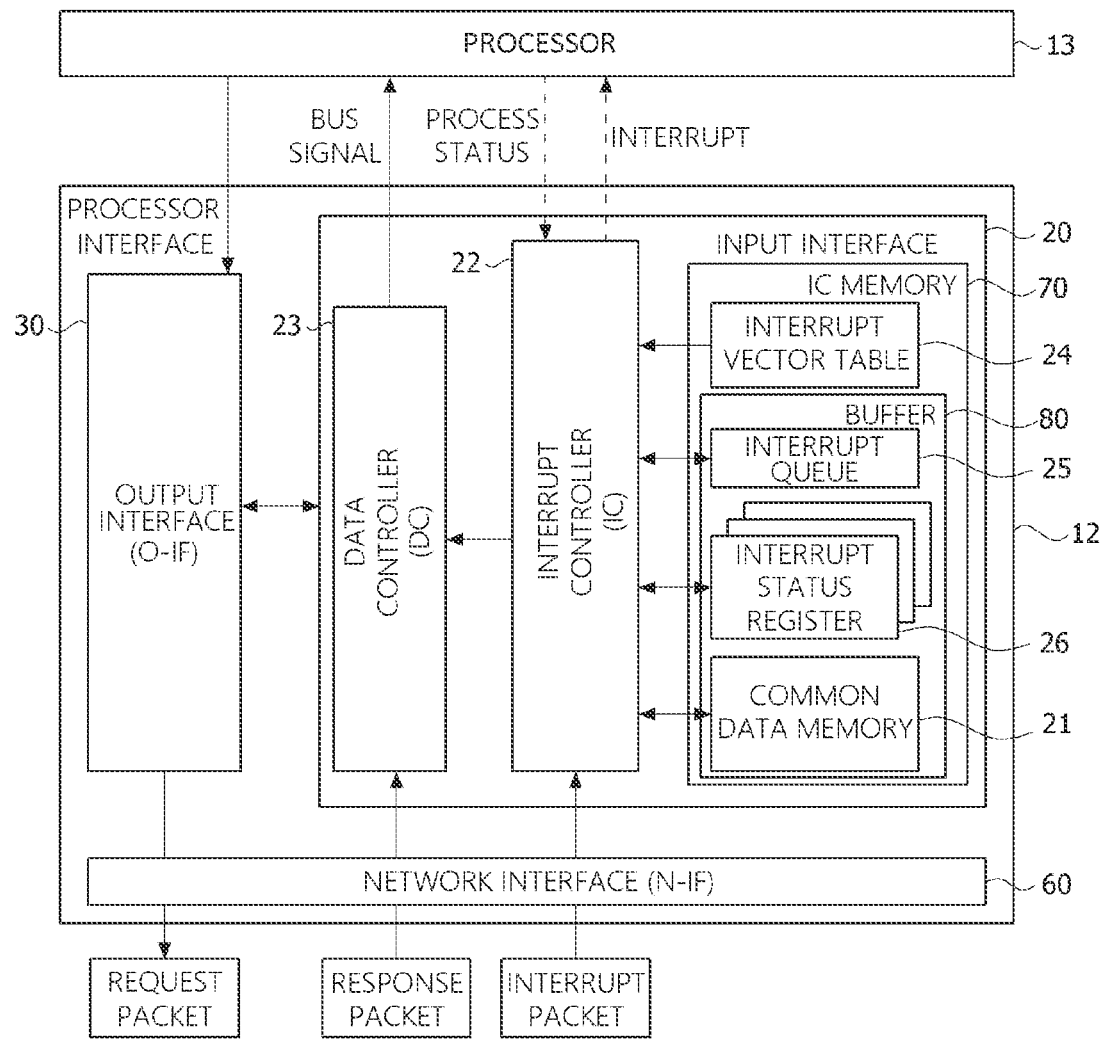
FIG. 3 is a diagram for describing a configuration and an operation of a processor interface according to the embodiment of the present invention.

FIG. 2 is a diagram for describing operations of the processor interface and the processor according to the embodiment of the present invention, and FIG. 3 is a diagram for describing a configuration and the operation of the processor interface according to the embodiment of the present invention.

Referring to FIGS. 2 and 3, when the processor 13 generates an interrupt vector in response to an IRQ signal, the O-IF 30 intercepts the interrupt vector delivers the interrupt vector to the I-IF, and the I-IF 20 transmits an instruction for starting an ISR corresponding to a currently activated interrupt signal to the processor 13. In this case, different ISRs are present according to the peripheral device and a type of the task, and the I-IF 20 has the interrupt vector table 24 according to the operation of the peripheral device 11 and knows information transmitted from the peripheral device 11, and thus the I-IF 20 may transmit an instruction to start an ISR suitable for the peripheral device 11. Accordingly, even without collecting necessary information from the peripheral device by executing a common ISR and without grasping the operation corresponding to the interrupt request, the processor 13 may execute the instruction transmitted according to the information previously grasped from the IC so that the required ISR may immediately start, thereby eliminating a common routine required each time the ISR is executed and reducing an execution cycle.

When the ISR is executed, the data transmitted from the peripheral device 11 is stored in the buffer 80 so that the O-IF 30 may recognize the data and transmit a request to the I-IF 20 to directly transmit the data to the processor 13. Through the above configuration, the transmission of a small amount of data may be completed between the processor 13 and the processor interface 12 without accessing the network. However, when the amount of data is large or a write operation is performed, the processor 13 may directly access the peripheral device 11 or may perform the task using the memory 14. When a symmetric interface is used, all devices may start communication, the peripheral device 11 may directly access the memory 14 in response to an instruction of the processor 13 to store related information and data, and the processor 13 may access the memory 14 to process the related information and data. When the ISR is completed, the processor 13 may return to the previous state. An arrow indicated by a dotted line in FIG. 2 indicates a case in which a task is performed using the memory 14, and the case occurs only when necessary, such as when the amount of pieces of data is large or a write operation is performed, but a frequency thereof is low.

In the processor interface 12 using the symmetric interface according to the embodiment, transmission and reception channels may be simultaneously present and may be operated independently of each other.

A response packet corresponding to the request of the processor 13 may be transmitted to the processor 13 through the data controller 23. Packets that start from the outside and are transmitted to the processor 13 are all interrupt requests and thus may be processed by the IC 22.

The IC 22 may analyze the packet to determine which peripheral device 11 requests from the DID and may analyze the interrupt status information to determine an ISR to be executed. The interrupt status information may include information necessary for interrupt processing and may include a DID, a PR, a TID, and a NAD as shown in Table 1.

According to a result of the analysis of the status information, an interrupt queue ID and the PR may be stored in the interrupt queue 25. When the queue is not empty, the PR may be compared with the pre-stored PR of the IRQ and the position of the IRQ in the queue may be determined according to the PR. Through the above configuration, the input IRQ may be processed according to the PR. That is, as the priority of the IRQ increases, the IRQ is positioned at a first position of the interrupt queue 25 and the IC may process the interrupt request positioned at the first position first.

At the same time, in an interrupt status register 26, the interrupt queue ID, the DID, the TID, and the NAD may be stored or an instruction of the interrupt vector table corresponding to the ISR may be stored unless the instruction is stored previously. By using the above information, when the processor 13 requests the ISR in an interrupt mode, the processor 13 may fetch a corresponding instruction from the interrupt vector table 24 and transmit the instruction through the data controller 23. A first instruction or address of each ISR may be designated in the interrupt vector table 24 and thereafter, the memory 14 may be accessed and the ISR may be executed. Therefore, a storage space for the interrupt vector table 24 is not large. Further, when there is a multiprocessor, the table may be shared. Thereafter, the data may be stored in the common data memory 21 according to a value of the NAD and a corresponding start address may be stored in the interrupt status register 26.

The IC may know the size of the interrupt queue 25 and determine the number of IRQ that may be sequentially processed, and when there is no empty space in the interrupt queue, the IC may no longer receive the IRQ packet. In this case, the packet transmission fails, and thus the peripheral device may re-transmit the interrupt packet. The data storage capacity of the common data memory 21 may determine a maximum size of data that may be transmitted to the processor interface 12 when the interrupt request is made by the peripheral device. The data may enable the processor 13 to rapidly read necessary data without accessing the peripheral device 11. In the case in which there is a multiprocessor, when the processors 13 share the data storage space in order to increase utilization of the storage space, the size of the common data memory 21 per processor may be reduced.

The interrupt vector table 24 of the I-IF 20 may include an address of the memory 14, in which the ISR is stored, together with a first instruction of the ISR. Therefore, a signal may be transmitted to a cache controller (not illustrated) to fetch a corresponding ISR code into an instruction cache in advance. When there is no cache controller or it is difficult to access the cache controller, instructions at the beginning of all the ISRs may be pre-stored in the internal buffer as much as the capacity of the cache line, or an instruction at the beginning of the corresponding ISR may be fetched and pre-stored in the internal buffer while the IRQ signal is transmitted to the processor 13. When the instruction at the beginning of the ISR is stored in the cache or the buffer, a waiting time may be reduced by the number of cycles from transmitting the IRQ signal until the first instruction is executed.

Table 2 shows a process of processing an interrupt request and the number of cycles in a simplest three-stage pipelined processor. In the conventional method such as (a), when an IRQ signal is generated (①), an interrupt mode should start to fetch a first instruction from a vector table of a memory in a next cycle. In this case, the possibility that a corresponding row of the memory 14 is open is low, and thus it is possible to read after an operation of closing a row and opening the corresponding row is performed (②). Since the first instruction is usually a branch-based instruction branching to a general ISR, a corresponding region of the memory 14 should be re-accessed and instructions at the beginning of the general ISR should be fetched. Even in this case, the operation of closing and opening a row should be performed. Further, thereafter, since consecutive instructions should be fetched, the cache controller performs a task for filling the cache with an instruction block (③). Thereafter, the general ISR is executed. After the peripheral device that requests the interrupt is determined by executing a common subroutine of the general ISR (common ISR) and accessing the external IC, the processor 13 executes a specific ISR, that is, the subroutine in the ISR suitable for the corresponding peripheral device. When two or more tasks are performed in the corresponding peripheral device, the common ISR includes the operation of accessing the corresponding peripheral to determine a task. Therefore, in the process of determining the specific subroutine of the ISR (specific ISR) that meets the interrupt request from the peripheral device, the memory should be accessed several times to fetch the instructions and an additional waiting time is required in the process (④).

In comparison with the above case, in the interrupt request processing device 10 according to the embodiment of the present invention, since the I-IF 20 knows the peripheral device 11 corresponding to the IRQ signal and the interrupt status information, it is possible to request to fetch the instructions in advance by transmitting the address information in which the related ISR code is stored to the cache controller while the IRQ signal is transmitted to the processor 13. When the processor 13 switches the mode to the interrupt mode and requests an instruction of the address of the interrupt vector, the O-IF 30 may transmit the request to the I-IF 20 to immediately transmit a corresponding instruction to the processor 13. The processor 13 may request instructions of the corresponding ISR, and the cache controller may transmit a following instruction to the processor immediately after the task is completed. Therefore, the fetching of the instruction for processing the interrupt request of the peripheral device may be executed at once and the fetching of the instruction may also be executed in advance using the IC and the cache controller, and thus the waiting time for fetching the instruction may be minimized.

Therefore, in the proposed method, the processes from ② to ③ of the existing method are omitted, and the process ④ may also be omitted when the interrupt vector table 24 includes the instructions at the beginning of the specific ISR. The process ④ starts at the same time that the IRQ signal is transmitted to the processor 13 when the interrupt vector table 24 includes the address of the specific ISR. In the case in which there is a waiting request, the process ④ is already completed when the processor processes the interrupt request, and thus the waiting time may be reduced by an amount thereof. As the operation of the ISR becomes simpler and the interrupts occur more frequently, the reduction in overhead significantly affects system performance. In the embodiment, a simple processor structure of a three-stage pipeline is considered, but a processor that is actually used has a more complex pipeline of seven or more stages. In this case, more cycles are required from the occurrence of the IRQ signal to the start of interrupt processing. Therefore, the method according to the embodiment of the present invention is more advantageous because the waiting time for memory access and cache filling after the start of the ISR is shortened. In Table 2, times required for backup and recovery of register data stored in the processor and a waiting time for network access are not considered.

TABLE 2

| IRQ | IRQ entry | | IRQ vector 1st instruction | | | |
|---|---|---|---|---|---|---|
| ①exec | ②memory access to IRQ vector table | | fetch | decode | exec | ③memory access to common ISR + cache filling |
| Common ISR entry | | | | | Specific ISR entry | |
| fetch | decode | exec ... | ④memory access to specific ISR + cache filling | | fetch decode exec | |
| | | | (a) | | | |
| IRQ | IRQ entry | | Specific ISR entry | | | |
| exec | fetch decode exec ... memory access to ISR + cache filling | | fetch decode exec | | | |
| | | | (b) | | | |

Figure 4:
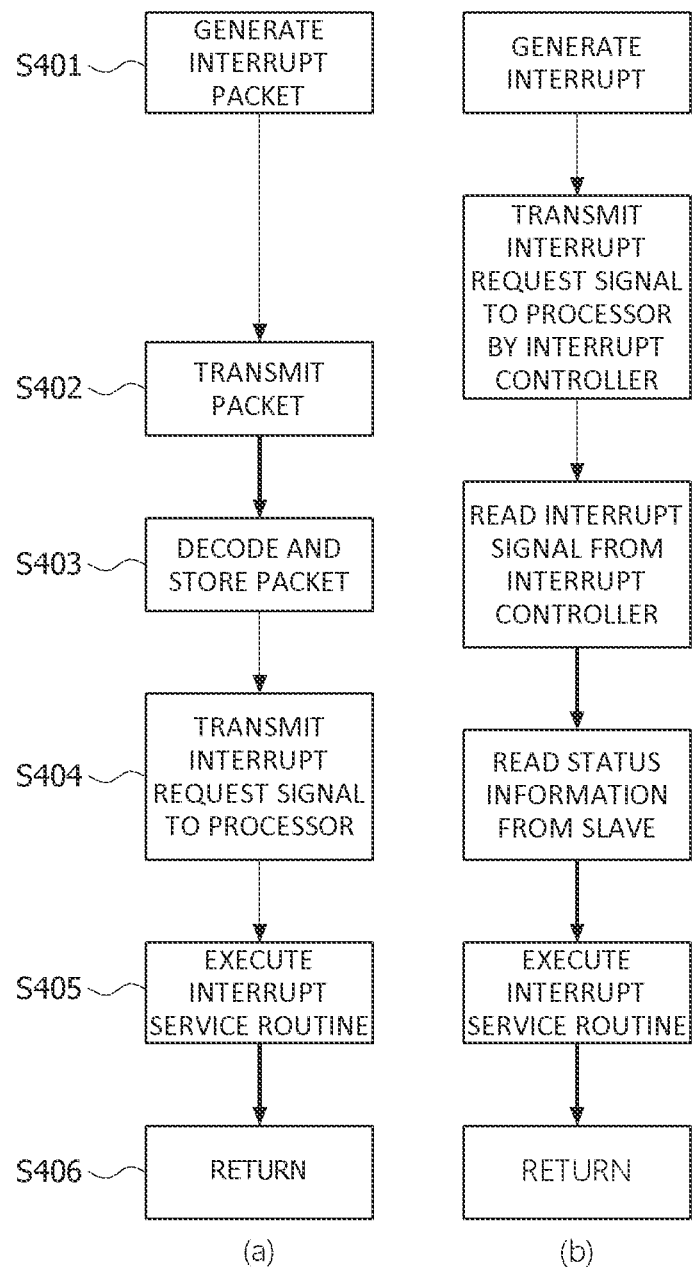
FIG. 4 illustrates flowcharts of an interrupt signal processing method according to the embodiment of the present invention.

FIG. 4 illustrates flowcharts of an interrupt signal processing method according to the embodiment of the present invention.

Referring to FIG. 4, the interrupt signal processing method according to the embodiment of the present invention may include generating, by a peripheral device, a packet when an IRQ signal is generated (S401), transmitting, by the peripheral device, the packet to a processor interface through an on-chip network (S402), decoding and storing, by a processor interface, the packet and transmitting the IRQ signal to the processor (S403), outputting, by the processor, an interrupt vector in response to the IRQ signal (S404), receiving, by the processor interface, the generated interrupt vector from the processor and transmitting an instruction corresponding to an activated interrupt signal to the processor (S405), and executing, by the processor, a corresponding ISR (S405) and then returning to the previous state (S406).

In FIG. 4, thick arrows indicate operations of accessing a network and thin arrows indicate direct data transmission inside logic. The data transmission inside the logic may be done only in one or two cycles. Referring to FIG. 4B, in the conventional method, the IRQ signal may be transmitted to an external IC, which has different structure and function from the IC 22, through a dedicated interrupt connection line, and when the processor starts to process an interrupt, the processor may access the IC and the peripheral device via the network, identify the interrupt request, and determine a task to be processed. In this case, each of write and read operations should be performed at least once. The external IC should be accessed through an on-chip-network while the IC 22 is internal. Even after the task is determined, the processor may re-access the peripheral device and a memory via the network and execute a specific ISR so that the task is completed.

In comparison with the above case, referring to FIG. 4A, in the processing method according to the embodiment, when the packet is transmitted as the interrupt request of a peripheral device, the network is accessed once and then the task to be processed by the processor is determined in the internal logic of the processor and the processor interface, and thus there is no overhead due to the network access. Further, data having a size that may be stored in the I-IF is stored in the buffer, and thus there is no need to access the peripheral device again. When the data should be stored in the memory 14, the peripheral device may serve as a master, and thus the data may be directly stored in the memory 14 and then the interrupt request may be transmitted to the processor. Therefore, the ISR accesses the peripheral device only when the processor needs to continuously read the data of the peripheral device, and thus a frequency of the network access is very low. Further, the processor 13 may also read, in advance, only a portion of the ISR necessary for the corresponding interrupt request, and thus a memory waiting time may be further reduced.

In the interrupt processing method according to the embodiment, unnecessary operations are eliminated from the process of determining a cause of the interrupt by the processor and most of the tasks may be completed only by communicating with the I-IF, which is more efficient than a conventional interrupt processing method. Further, the method according to the embodiment is applicable to the conventional processor structure and it is necessary to change a N-IF logic with a symmetric interface, and add a processor interface. Further, the ISR needs some modification, but a main software program thereof may be used without change, and thus compatibility with the conventional system is high.

Even in the case of the asymmetric interface protocol, a N-IF may be symmetric when both of the processor and the peripheral device are designed to have master and slave interface logic, and the method according to the embodiment may be applied. That is, the interrupt processing method according to the embodiment may be implemented regardless of the interface protocol method. However, in the case of the asymmetric interface protocol, the number of signal lines of added interface logic is increased about two times, and thus the efficiency compared to the frequency of use is very low, which is not effective. Therefore, the interrupt processing method is more effective when using a symmetric interface protocol.

Figure 5:
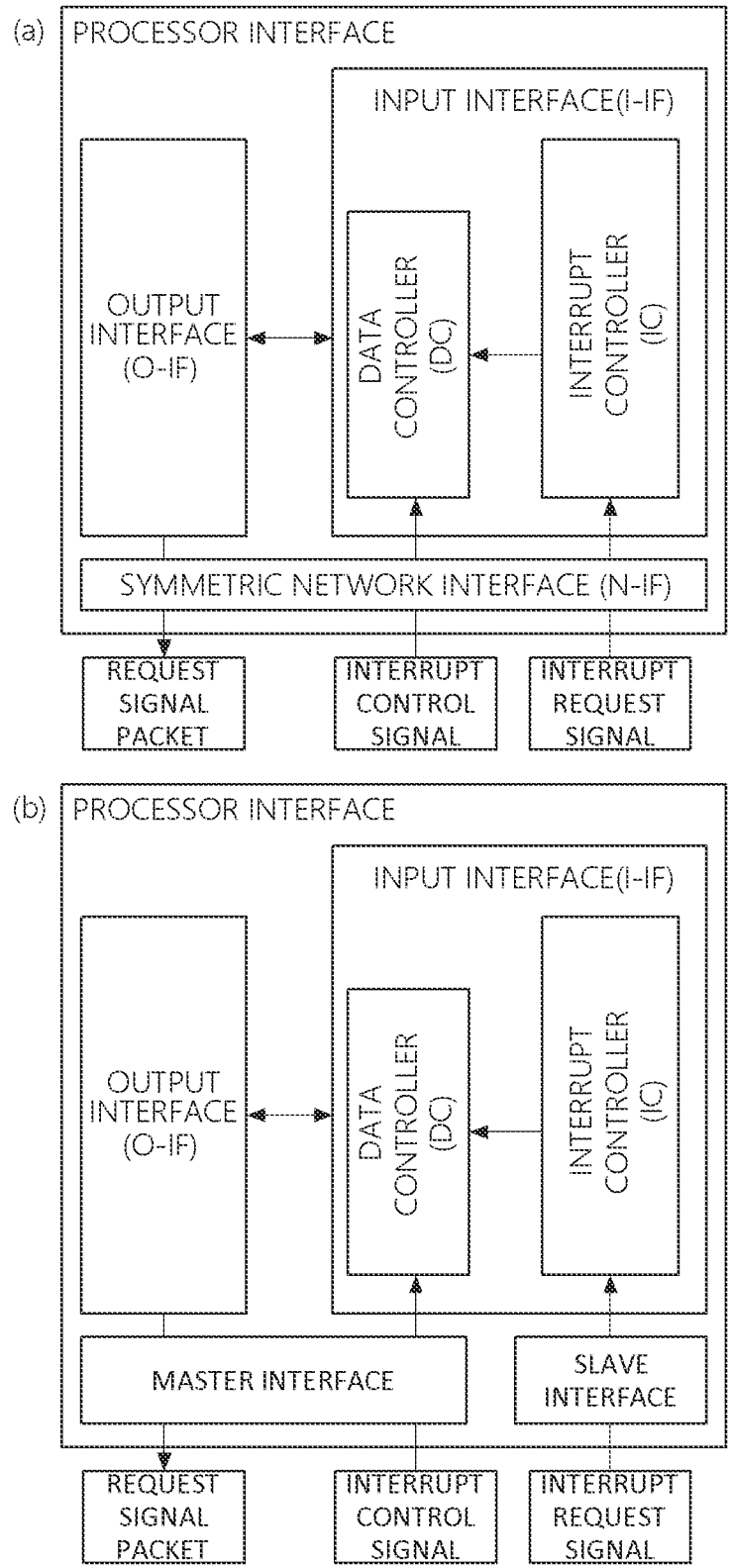
FIG. 5 illustrates block diagrams illustrating a configuration of an interrupt request processing device using a symmetric interface protocol and a configuration of an interrupt request processing device using an asymmetric interface protocol.

FIG. 5 illustrates block diagrams illustrating a configuration of an interrupt request processing device using a symmetric interface protocol and a configuration of an interrupt request processing device using an asymmetric interface protocol. In FIG. 5, a memory including a buffer is omitted. Referring to FIG. 5A, in a case in which the symmetric interface protocol is used, all packets are transmitted through a single N-IF. Referring to FIG. 5B, in a case in which the asymmetric interface protocol is used, data read and write operations of a processor are performed through a master interface, and interrupt packet transmission is performed through a slave interface. The N-IF of FIG. 5B with asymmetric interface protocol is symmetric by using both the master interface and the slave interface. A request packet is output through an O-IF, and a response data packet for a fetch request is transmitted to the processor by a data controller of an I-IF. The IC of the I-IF receives and processes an interrupt packet.

Figure 6:
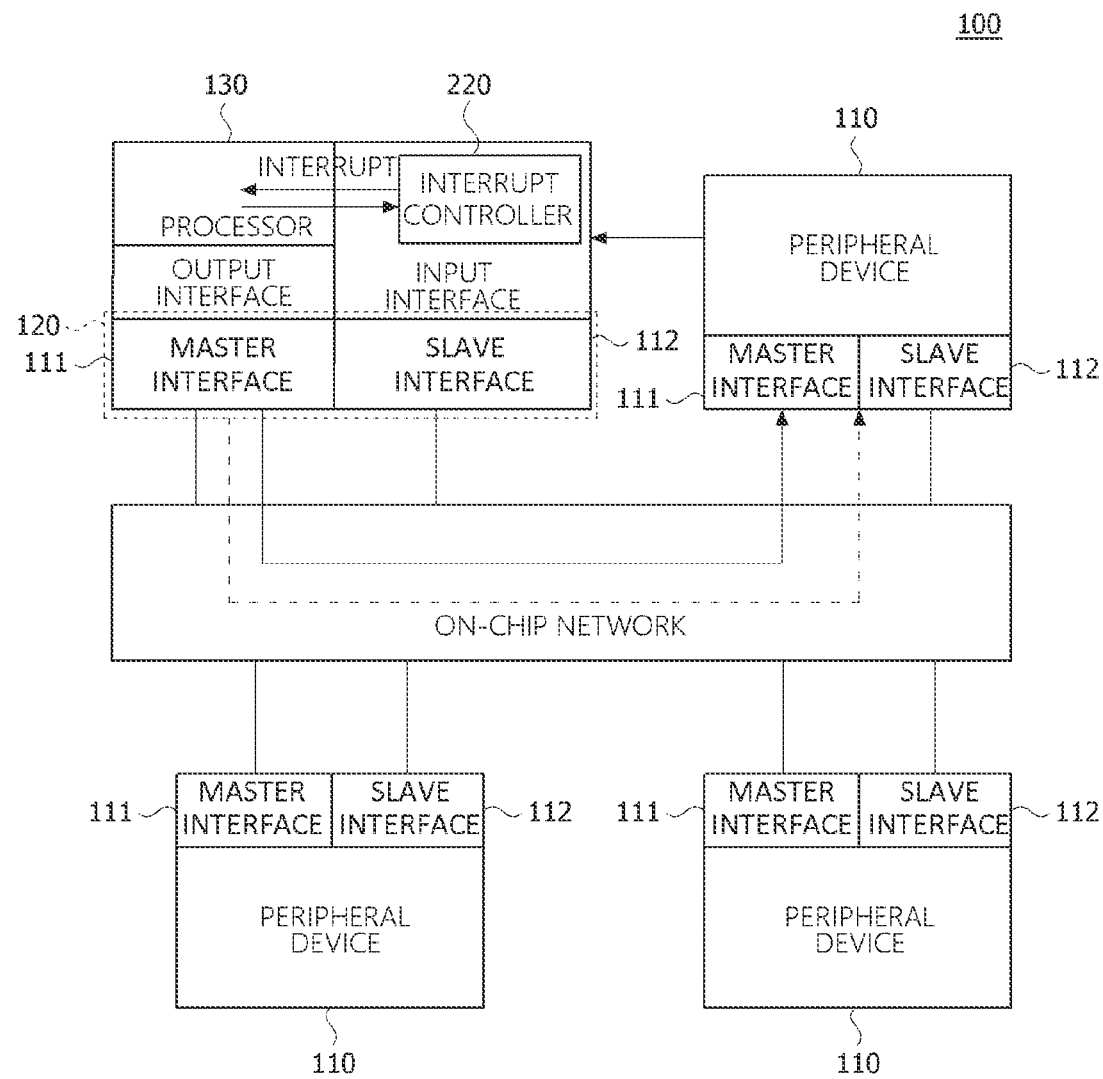
FIGS. 6 and 7 are block diagrams illustrating configurations of interrupt request processing devices according to other embodiments.

FIG. 6 is a block diagram illustrating a configuration of an interrupt request processing device according to an embodiment.

Referring to FIG. 6, an interrupt request processing device 100 of a system using an asymmetric interface protocol according to the embodiment of the present invention may include at least one peripheral device 110, at least one processor 130, and processor interfaces. Each of the processor interfaces may include an I-IF including an IC, an O-IF, a master interface 310, and a slave interface 320. Through the above configuration, unnecessary processes for interrupt processing may be eliminated so that an interrupt operation may be completed with a minimum number of operations.

The peripheral device 110 may have a master interface 111 and a slave interface 112, and when an interrupt signal generation situation occurs, the peripheral device 110 may generate an interrupt packet and transmit the interrupt packet to the processor interface through the master interface 111.

The IC 220 analyzes the interrupt packet, stores necessary information and data in a buffer, and stores an interrupt request in an interrupt queue. In this case, a position of the interrupt request in the queue is determined according to a priority policy. The IC 220 issues interrupt requests queuing in the interrupt queue to the processor 130 sequentially.

When the processor 130 generates an interrupt vector in response to an IRQ signal, the I-IF of the IC 220 may intercept the interrupt vector and transmit an instruction for starting an ISR corresponding to a currently activated interrupt signal to the processor 130. In this case, since the I-IF has an interrupt vector table according to the operation with the peripheral device 110 and knows information transmitted from the peripheral device 110, it is possible to transmit an instruction to start the ISR suitable for the operation, and the processor 130 may immediately start the specific ISR corresponding to the interrupt without executing a common ISR.

When the ISR is executed, the processor 130 may request the data which was transmitted from the peripheral device 110 and was stored in the buffer, and the O-IF may recognize the data, transmit a request to the I-IF, and the I-IF directly transmit the data to the processor 130. When the address is allocated to the buffer, corresponding data may be read directly. Through the above configuration, a small amount of data transmission may be completed between the processor 130 and the processor interface without network access. When there is a large amount of data or a write operation is performed, the processor 130 directly accesses the peripheral device or performs a task using the memory. Since all devices having a master interface may start communication, the peripheral device 110 may directly access the memory. When the ISR is completed, the processor 130 may return to the previous status. When the processor 130 accesses the peripheral device 110 via an on-chip network, the above case occurs only when necessary and a frequency thereof is low.

Figure 7:
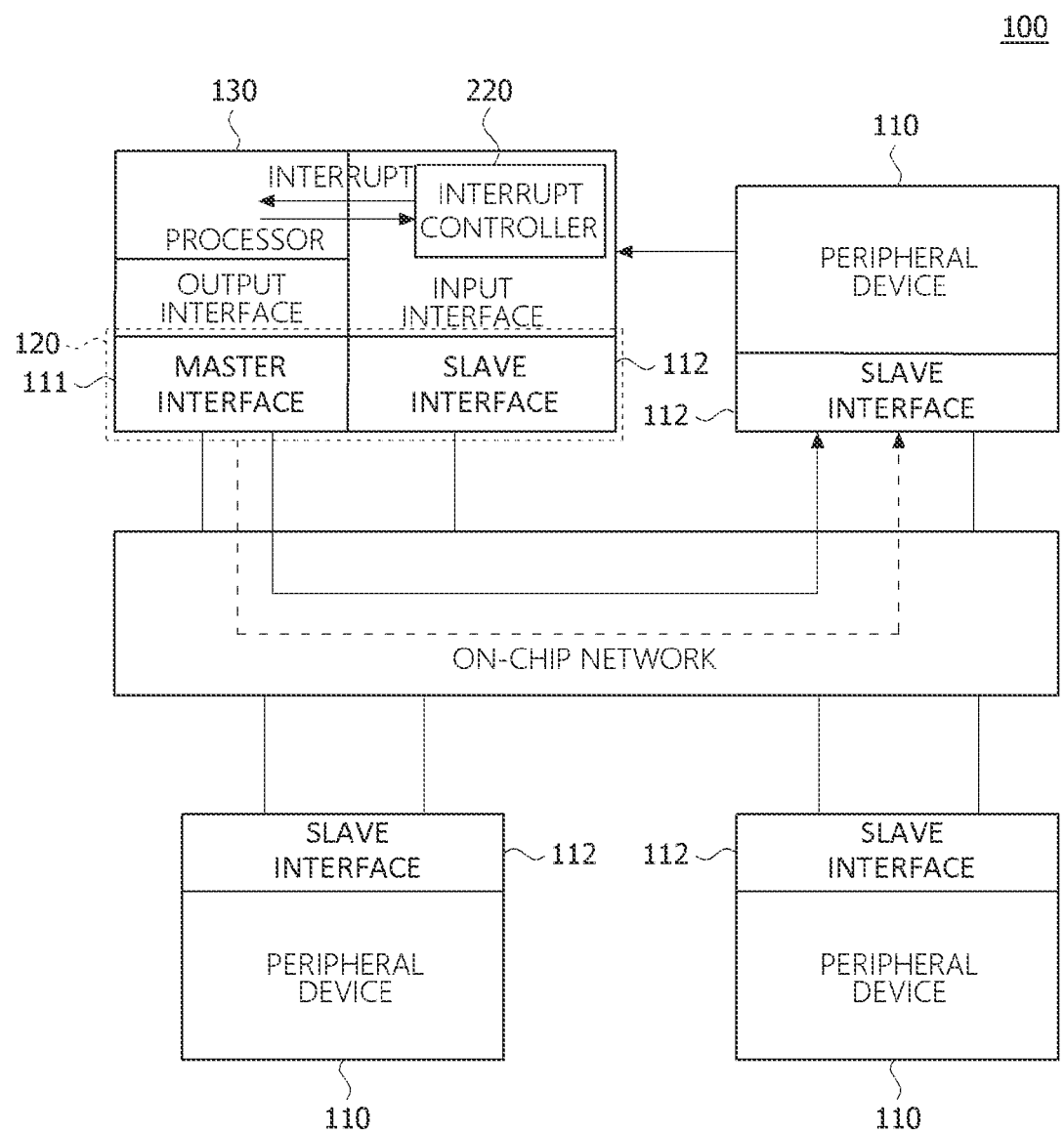

FIG. 7 is a block diagram illustrating a configuration of an interrupt request processing device according to an embodiment.

Referring to FIG. 7, an interrupt request processing device 100 according to the embodiment of the present invention may include at least one peripheral device 110, at least one processor 130, and processor interfaces. Each of the processor interfaces may include an I-IF including an IC, an O-IF, a master interface 310, and a slave interface 320. In FIG. 7, a buffer connected to the IC and an interrupt vector table are omitted. Through the above configuration, the common ISR may be eliminated so that a specific ISR may be completed with a minimum number of operations. The peripheral device 110 may include a slave interface.

When an interrupt signal generation situation occurs, the peripheral device 110 may generate an IRQ signal and transmit the IRQ signal to an IC 220 through an interrupt signal line (①) separated from an on-chip network.

The IC 220 may access the peripheral device 110 through the master interface 310 of the processor interface according to a priority of an input interrupt signal, read interrupt processing information and data, and decode and store the interrupt processing information and data in a buffer. The IC 220 may transmit an interrupt signal to the processor 130. In this case, when there is an interrupt task queuing in an interrupt queue, a queue order may be changed according to a priority policy. When there is a task queuing in the interrupt queue, the IC 220 may read the information and the data from the peripheral device during a queuing time, and thus performance may be improved compared to a conventional method in which the processor directly reads information and data from the peripheral device.

The operation of the processor is the same as the operation of the processor of FIG. 5.

The configuration of FIG. 7 has an advantage in that the conventional system may be applied only by redesigning the processor interface and modifying the ISR.

Figure 8:
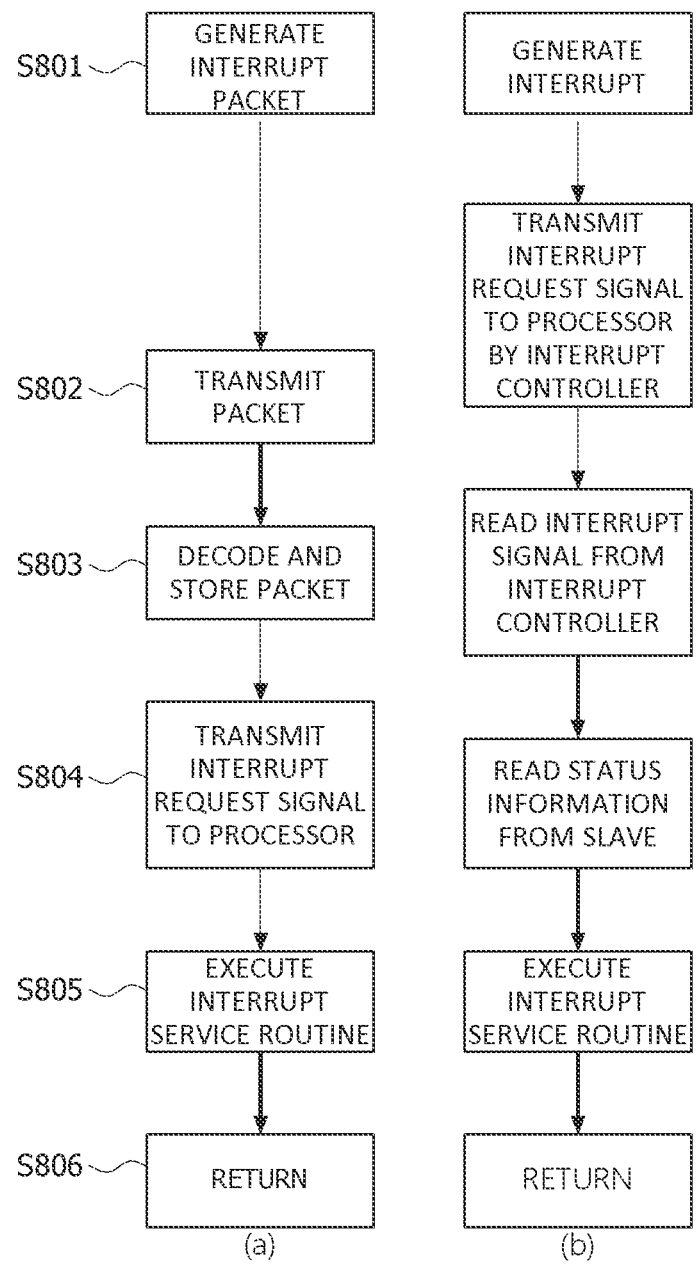
FIG. 8 illustrates flowcharts of an interrupt signal processing method according to another embodiment.

FIG. 8 illustrates flowcharts of an interrupt signal processing method according to an embodiment.

Referring to FIG. 8, the interrupt signal processing method may include generating, by a peripheral device, an IRQ signal and transmitting the IRQ signal to an IC (S801), accessing, by the IC, the peripheral device through a master interface and fetching a packet corresponding to the IRQ signal (S802), decoding and storing, by the IC, the packet (S803), transmitting, by the IC, the IRQ signal to a processor (S804), outputting, by the processor, an interrupt vector corresponding to the IRQ signal, receiving, by the processor interface, the interrupt vector generated from the processor and transmitting an instruction corresponding to an activated interrupt signal to the processor, and executing, by the processor, a corresponding specific ISR (S805), and returning to the previous status (S806).

In FIG. 8, thick arrows indicate operations of accessing a network and thin arrows indicate direct data transmission inside logic. The data transmission inside the logic may be done only in one or two cycles. Referring to FIG. 8B, in the conventional method, the IRQ signal may be transmitted to the external IC through a dedicated interrupt connection line, and when the processor starts to process an interrupt, the processor may access the IC and the peripheral device via the network, identify the interrupt request, and determine a task to be processed by executing a common ISR. In this case, each of write and read operations should be performed at least once. Even after the task is determined, the processor may re-access the peripheral device via the network so that the task is completed by executing a specific ISR.

In comparison with the above case, referring to FIG. 8A, the IC that receives the IRQ signal may access the peripheral device, and may read the interrupt information of the peripheral device and attached data and may store the interrupt information of the peripheral device and the attached data inside the IC memory. In particular, when there is a waiting request in an interrupt queue, the IC reads the information and the data from the peripheral device while the interrupt request is in a waiting state, and thus a waiting time of the processor may be further reduced. Thereafter, the processor may access the data stored inside the processor interface and perform the interrupt process so that overhead due to additional network access is not generated. Therefore, the ISR accesses the peripheral device only when the processor needs to continuously read the data of the peripheral device, and thus a frequency of the network access is very low.

In the method according to the embodiment, unnecessary operations are eliminated from the process of determining a cause of the interrupt by the processor and most of the tasks may be completed only by communicating with the processor interface, which is more efficient than the conventional interrupt processing method. Further, the method according to the embodiment is applicable to the conventional processor structure and it is necessary to change processor interface logic including the IC. There is an advantage in that the ISR needs some modification, but a main software program thereof may be used without change.

Figure 9:
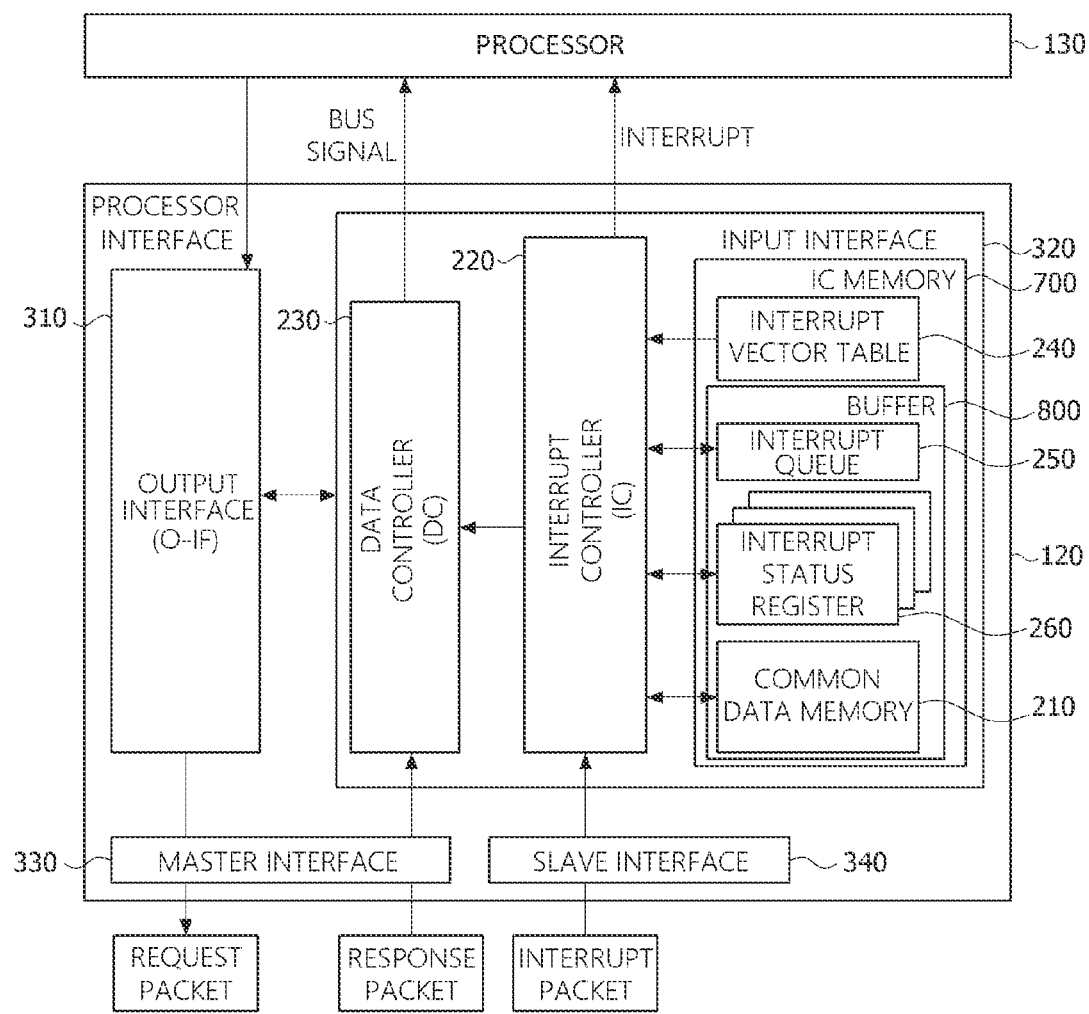
FIG. 9 is a diagram for describing a configuration and an operation of a processor interface according to another embodiment.

FIG. 9 is a diagram for describing a configuration and an operation of a processor interface according to an embodiment.

Referring to FIG. 9, a configuration in an interrupt processing method according to the embodiment is the same as that of FIG. 3 but is different from that of FIG. 3 in that a master interface 330 and a slave interface 340 are separated by applying an asymmetric protocol interface protocol to the N-IF 360 so that a processor interface may serve as a master and a slave. The configuration of FIG. 9 is a detailed description of the processor interface of FIGS. 5B and 7, and a conventional processor structure may be used without change. The slave interface 340 is an interface for communicating with the IC 220, and when a peripheral device has a master interface, the slave interface 340 is an interface for the peripheral device to generate or transmit an interrupt packet, or in a multiprocessor system, the slave interface 340 is an interface for another processor to access the IC 220 or for compatibility with the conventional system.

The I-IF 320 may include an IC memory 700, a data controller (DC) 230 for transmitting address/data/control signals, and an IC 220 for processing an interrupt signal. A response according to a request of the processor 130 may be transmitted to the processor 130 through the data controller 230. The IC 220 may read packet information from the peripheral device through the master interface 330 to analyze the information, and analyze status information of an interrupt request from the packet information of the peripheral device to determine a specific ISR to be executed.

The IC memory 700 may include an interrupt vector table 240 and a buffer 800, and the buffer 800 may include an interrupt queue 250, an interrupt status register 260, and a common data memory 210.

In an embodiment, the interrupt status information may include information necessary for interrupt processing and may include a DID, a PR, a TID, and a NAD as shown in Table 1 above.

According to a result of the analysis of the status information, an interrupt ID and the PR may be stored in the interrupt queue 250. When the queue is not empty, the PR may be compared with the pre-stored PR of the IRQ signal and a storage position may be determined according to the PR. Through the above configuration, the input IRQ signal may be processed according to the PR. That is, as the priority of the IRQ signal increases, the IRQ signal is positioned at a first position of the interrupt queue 250.

At the same time, in the interrupt status register and the buffer 800, the interrupt ID, the DID, the TID, and the NAD may be stored or an address and initial instructions corresponding to the specific ISR may be stored in the interrupt vector table. By using the above information, when the processor 130 requests the ISR in an interrupt mode, the processor 130 may fetch a corresponding instruction from the interrupt vector table 240 and transmit the instruction through the data controller 230. A first instruction or address of each specific ISR may be designated in the interrupt vector table 240 and thereafter, a memory may be accessed and the specific ISR may be executed. Therefore, a storage space for the interrupt vector table 240 is not large. Further, when there is a multiprocessor, the table may be shared. Thereafter, the data may be stored in the common data memory according to a value of the NAD and a corresponding start address may be stored in the interrupt status register in the buffer.

The IC may know the size of the interrupt queue 250 and determine the number of IRQ signals that may be sequentially processed, and when there is no empty space in the interrupt queue, the IC may no longer receive the IRQ signal. In this case, even when the interrupt signal request enters, the IC does not fetch the interrupt packet until there is an empty space in the interrupt queue. The data storage capacity of the common data memory 210 may determine a maximum size of data that may be transmitted to the processor 130 when the interrupt request is made by the peripheral device. The data may enable the processor 130 to rapidly read necessary data without accessing the peripheral device. In the case in which there is a multiprocessor, when the processors 130 share a data storage space in order to increase efficiency of the storage space, the size of the common data memory 210 may be reduced.

The interrupt vector table 240 of the I-IF 320 may include an address of the memory in which the ISR is stored, together with initial instructions of the ISR. Therefore, a signal may be transmitted to a cache controller (not illustrated) to fetch a corresponding ISR instruction into an instruction cache in advance. In this case, a waiting time may be reduced by the number of cycles from transmitting the IRQ signal until the first instruction is executed.

Table 3 shows a process of processing an interrupt request and the number of cycles in a simplest three-stage pipelined processor. In the conventional method such as (a), when an IRQ signal is generated (①), an interrupt mode should start to fetch a first instruction from a vector table of the memory in a next cycle. In this case, the possibility that a corresponding row of the memory 14 is activated is low, and thus reading is possible after an operation of closing (precharging) and opening (activating) the row is performed (②). Since the first instruction is a branch-based instruction pointing the location of a common ISR, the corresponding instructions in another row should be fetched. Even in this case, the operation of closing and opening the row should be performed. Further, thereafter, since consecutive instructions should be fetched, the cache controller performs a task for filling the cache line with an instruction block (③). Thereafter, the common ISR is executed. The specific ISR suitable for the IRQ signal is executed after accessing the IC and the corresponding peripheral device, and thus an additional waiting time is required in the memory access process (④).

In comparison with the above case, in an embodiment, when there is an interrupt waiting (b), the peripheral device may be accessed during a waiting time and necessary information and data may be read, and it is possible to request to fetch the instructions in advance by transmitting the address information in which the related ISR instructions are stored to the cache controller while transmitting the IRQ signal to the processor. When the processor switches the mode to the interrupt mode and requests an instruction of an ISR or data, the O-IF may transmit the request to the I-IF to immediately transmit a instruction of a specific ISR or data to the processor. When the processor requests instructions of the corresponding ISR, the cache controller may transmit the instructions to the processor immediately. Therefore, the fetching of the instruction for processing the interrupt request of the peripheral device may be executed at once and the fetching of the instruction may also be executed in advance using the IC and the cache controller, and thus the waiting time for fetching the instructions may be minimized.

Therefore, in the proposed method, the processes from ② to ③ of the conventional method are omitted, and even in the case of ④, the process ④ starts at the same time that the IRQ signal is transmitted to the processor. Therefore, in the case in which there is a waiting request, the process ④ is already completed when the processor processes the corresponding interrupt request, and thus the waiting time may be shortened by an amount thereof. As the operation of the ISR becomes simpler and the interrupts occur more frequently, the reduction in overhead significantly affects system performance.

On the other hand, in the case in which there is no interrupt waiting (c), the IC waits while accessing the peripheral device and reading necessary information and data, and then generates an IRQ signal to the peripheral device, and thus the interrupt processing may be delayed by that amount of time.

In an embodiment, a simple processor structure of a three-stage pipeline is considered, but a processor that is actually used has a more complex pipeline of seven or more stages. In this case, more cycles are required from the occurrence of the IRQ signal to the start of interrupt processing. Therefore, the method according to the embodiment of the present invention is more advantageous because the waiting time for memory access and cache filling after the start of the ISR is shortened. In Table 3, times required for backup and recovery of register data stored in the processor and a waiting time for network access are not considered.

processing device may designate a processor for processing the non-designated IRQ using at least one of an interrupt signal processing designation method, a global interrupt

TABLE 3

```
IRQ    IRQ entry                                IRQ vector 1st instruction
①exec  ②memory access to IRQ vector table      fetch  decode  exec      ③memory access to common ISR + cache
                                                                                            filling
Common ISR entry                                                         Specific ISR entry
   fetch  decode  exec   ...   ④memory access to specific ISR + cache    fetch  decode  exec
                                         filling
                                                              (a)
IRQ    IRQ entry                       Specific ISR entry
  exec   fetch   decode  exec  ...     fetch   decode   exec
                 Access to peripheral
                                                              (b)
Network access                                  IRQ    IRQ entry                              Specific ISR entry
                 Access to peripheral           exec    fetch    decode  exec   ...           fetch   decode
```

Figure 10:
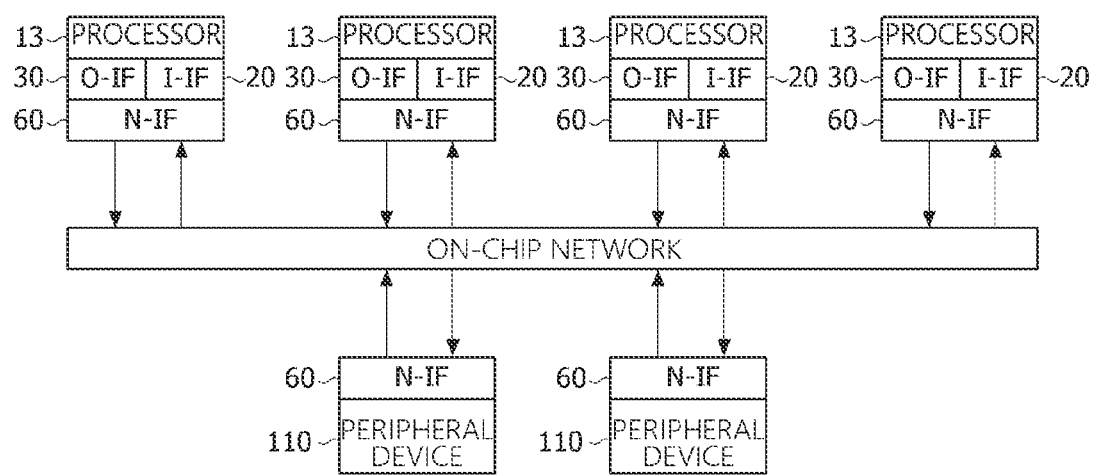
FIGS. 10, 11, 12, 13 and 14 are diagrams for describing operations of multiprocessor interrupt request processing devices according to embodiments.

FIG. 10 is a diagram for describing an operation of an interrupt request processing device including a plurality of peripheral devices, processor interfaces, and processors according to an embodiment. Referring to FIG. 10, when an IRQ is a designated IRQ which should be delivered to a designated processor, a peripheral device 110 may generate and transmit a packet using a designated processor ID.

When a designated IRQ packet generation situation occurs, the peripheral device 11 may generate a packet on the basis of a corresponding processor ID in interface logic and may transmit the generated packet to a processor interface 12 via an on-chip network.

In a system using a symmetric interface, when the peripheral device 11 completes one task and generates an interrupt, the peripheral device 11 may generate and transmit the packet to an address of an I-IF of a corresponding processor using the stored processor ID. This is possible because the peripheral device 11 may start a communication with a symmetric interface.

Therefore, in the case in which a designated IRQ is generated, when the processor 13 requests a task to the peripheral device, the processor 13 for processing the designated IRQ is designated, or the peripheral device 11 may generate and transmit a packet to a pre-designated processor 13. When a specific processor 13 is designated, it is possible to operate under limited conditions in the conventional commercial system, but in the embodiment of the present invention, it is possible for the specific processor to process the IRQ without any limitation.

In the case of the embodiment, when the IRQ is generated, the packet may be generated according to the stored processor ID and directly transmitted to the corresponding processor 13, and thus it is possible to directly request the interrupt to a specific processor regardless of the number of processors 13. Further, even when the number of processors 13 is increased, the interrupt request may be processed in the same manner as in the case of one processor 13 without adding circuits or connection lines.

In an embodiment, the designated IRQ may refer to an IRQ which should be processed by a designated processor 13. Further, the non-designated IRQ signal may refer to an IRQ signal which may be processed by any processor 13. In the case of the non-designated IRQ signal, the processor 13 for processing the corresponding interrupt may be designated according to an embodiment described below.

Thereafter, in the embodiment of the present invention, when the IRQ is a non-designated IRQ, the interrupt request distributor method, a non-designated dedicated interrupt request processing device method, and a daisy chain method.

In an embodiment, when the IRQ signal is a non-designated IRQ signal, the peripheral device 11 may arbitrarily designate the processor 13 connected to the on-chip network according to the interrupt signal processing designation method of the peripheral device and generate and transmit the packet using a designated processor ID.

In this case, as a frequency of occurrence of the IRQ signal increases, the peripheral device 11 may arbitrarily designate one of a greater number of processors 13 and generate and transmit the packet to the designated processor 13. In this case, the processor that is designated may be changed each time when the interrupt request is generated.

When the peripheral device 11 designates the processor 13 for processing the non-designated IRQ by itself, a combination of the peripheral device 11 and the processor 13 may be configured to designate a dedicated processor 13 for each peripheral device 11 or designate the processor 13 according to a predetermined algorithm. In the case in which a difference in the frequency of occurrence of the interrupt is large depending on the peripheral device 11, in the method of designating the dedicated processor 13 for each peripheral device 11, the load of the specific processor may be increased, and when the workload of the specific processor 13 is large, the interrupt processing of the connected peripheral device 11 may be delayed. Therefore, the method of designating the dedicated processor 13 for each peripheral device 11 is effective when an amount of the interrupt generation is similar in each peripheral device 11.

When the peripheral device 11 designates the processor 13 by itself, the designation is determined without knowing the load of the processor 13, and thus an interrupt request may not be processed promptly according to the load situation of the processor 13. Further, when several peripheral devices 11 are operated in the same manner, interrupt requests may be driven to a specific processor 13 at any moment. In this case, it aims to prevent the interrupt processing load from being concentrated on the specific processor 13 by distributing the interrupt request from the peripheral device 11 to multiple processors 13 alternatively, but the designation is determined without knowing the load situation of the processor 13. Therefore, there is a problem in that it is difficult to distribute the load evenly to the processors 13 all the time.

Therefore, when there is a large variation in the amount of interrupts generated by the peripheral devices 11, it is effective that the peripheral device 11 with a high frequency of occurrence of the interrupt requests to distribute the interrupt to multiple processors 13 alternatively, and that the peripheral device 11 with a low frequency of occurrence of the interrupt designates the specific processor 13 or a smaller number of processors 13.

In another embodiment, when the IRQ signal is a non-designated IRQ signal, the processor 13 may designate a processor 13 for processing the non-designated IRQ signal in consideration of a periodically measured load of the processor 13. The load information may include the number of interrupt request in the IRQ queue 25 as well as a load information provided by the processor 13. The method of designating the processor in consideration of the load of the processor 13 may be applied to a method of designating a processor to process all of the non-designated IRQ signals according to the embodiment of the present invention. That is, the processor may be designated in additional consideration of a method of considering the load of the processor in the interrupt signal processing designation method, the global interrupt distributor method, the non-designated dedicated interrupt request processing device method, and the daisy chain method of the peripheral device.

When the peripheral device 11 is set in the processor 13, there is an advantage in that a processor 13 to be connected to each peripheral device 11 in software according to the status of the operation and the workload of the processor 13 may be designated, thereby enabling dynamic allocation. The above method has advantages in that the processor 13 for interrupt processing may be designated in a simple manner and resources of the processor 13 may be efficiently utilized.

In still another embodiment, a global interrupt distributor 40 which receives the packet from the peripheral device 11 via the on-chip network and is connected to the plurality of processors 13 to determine a processor 13 for processing the IRQ signal may be further included.

Figure 11:
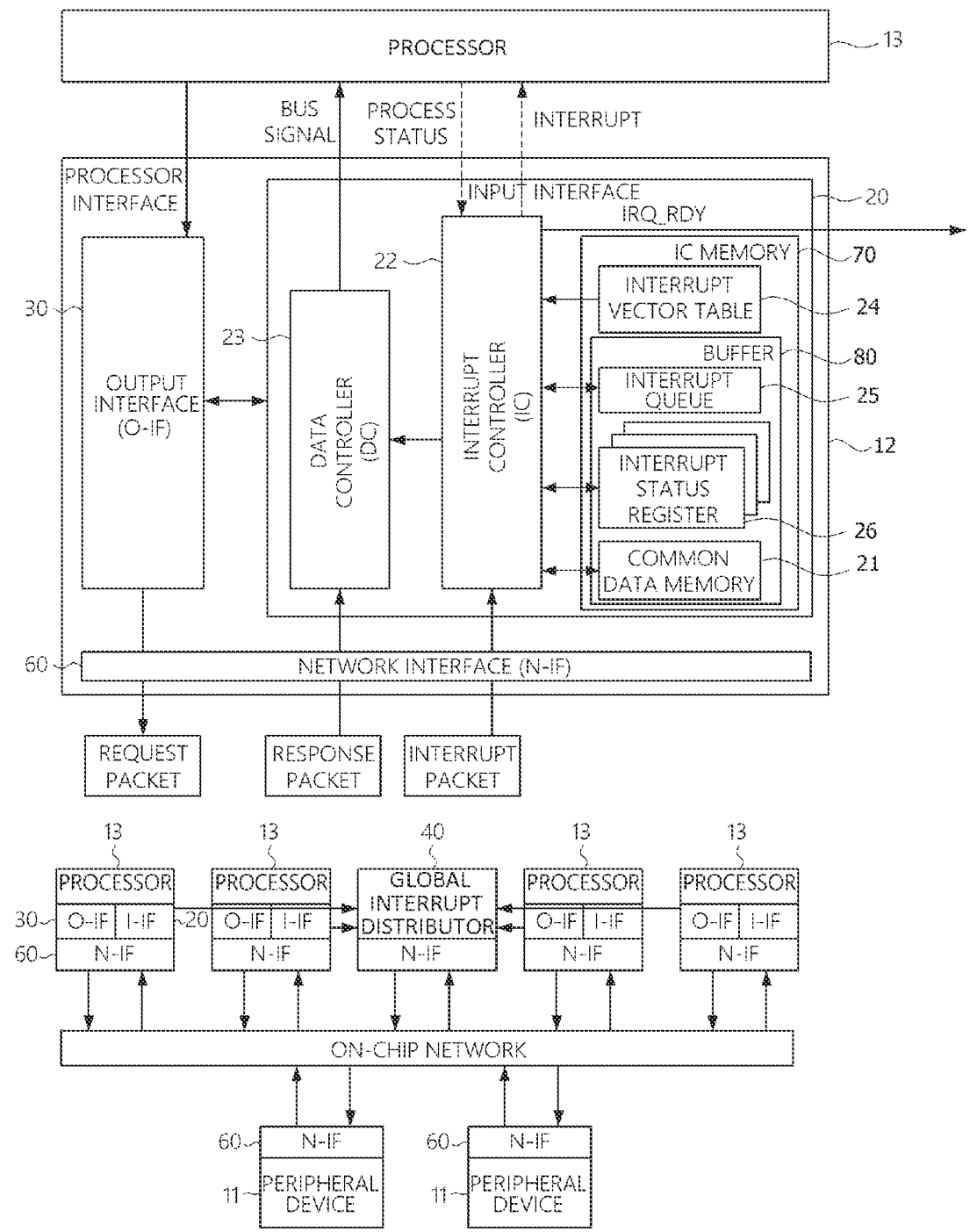
Figure 12:
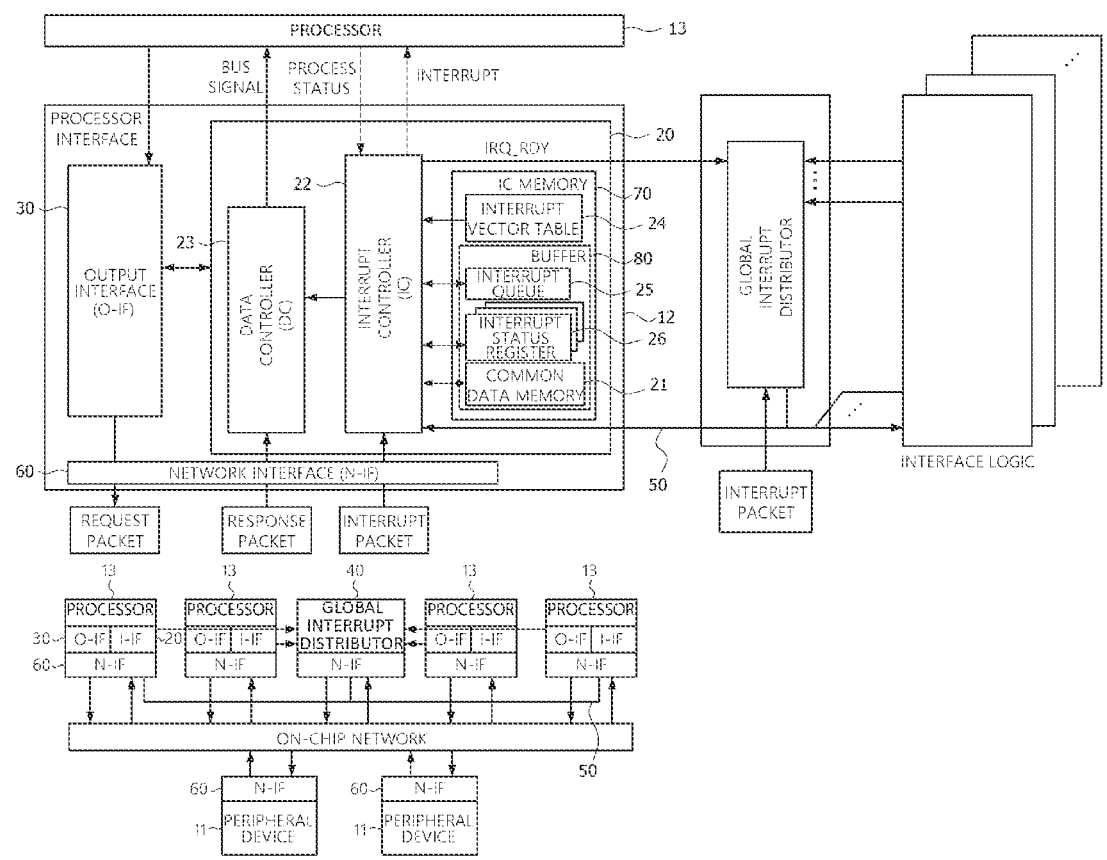

FIGS. 11 and 12 are diagrams for describing an operation of an interrupt request processing device according to an embodiment.

Referring to FIG. 11, when an IRQ signal is a non-designated IRQ signal, a global interrupt distributor 40 may receive a ready signal from a plurality of processors 13 according to a global interrupt distributor method, designate a processor 13 for processing the IRQ signal in response to the ready signal, and transmit an interrupt request packet to a corresponding processor. The ready signal may include the availability and workload of the processor 13 and the number of waiting interrupt requests in the IRQ queue 25.

The peripheral device 11 transmits the non-designated IRQ signal to the global interrupt distributor 40 using a symmetric interface protocol. The global interrupt distributor 40 checks a ready signal (IRQ_RDY) transmitted from an IC 22 of each processor 13 and designates one of the processors 13 that may process the IRQ signal. The global interrupt distributor 40 may re-transmit the packet to the designated processor 13 via a network.

That is, the IC 22 of each processor receives status information such as a resource availability status and a load status of the processor 13 from the processor 13 and transmits the packet including the number of interrupt requests in the IRQ queue to the global interrupt distributor 40. The global interrupt distributor 40 may receive the packet to designate the processor 13 to process the packet in response to the ready signal and transmit the packet to an I-IF of the designated processor 13.

Referring to FIG. 12, the global interrupt distributor 40 and the processor 13 may be connected via an on-chip network or an interrupt packet bus (IPB) 50 so that the global interrupt distributor 40 may transmit the packet to the designated processor 13 via the on-chip network or the IPB 50. In the case in which the global interrupt distributor 40 accesses the network in order to transmit the packet to the I-IF 20 of the processor 13, when a latency is large, an IPB 50 may be generated between the IC 22 of each processor 13 and a router (not illustrated) of the global interrupt distributor 40, and the processor 13 may be designated at the same time as the packet is input, and the packet may be transmitted to the designated processor 13 via the IPB 50.

The global interrupt distributor 40 may route the packet to the I-IF 20 of the designated processor 13 every cycle in response to the ready signal and immediately transmit the packet via the IPB, and thus there is no latency.

Further, a quality of service (QoS) transmission method or a priority transfer method may be supported. Since the QoS transmission method is performed preferentially in the on-chip network, the packet may be transmitted to a destination most rapidly, and thus it is more effective than generating the IPB 50. The interrupt packet requires rapid processing and the method is suitable for QoS transmission because a size of the packet is small and a frequency of occurrence is relatively low. The interrupt packet transmitted from the peripheral device 11 and the packet for configuring the global interrupt distributor 40 by the processor 13 may be transmitted to the global interrupt distributor 40. In this case, the global interrupt distributor 40 may analyze a header of the packet to determine whether the packet is an interrupt packet or a packet for configuring the global interrupt distributor, and when it is determined that the packet is the packet for configuring the global interrupt distributor, the interrupt may be processed in the global interrupt distributor 40.

Figure 13:
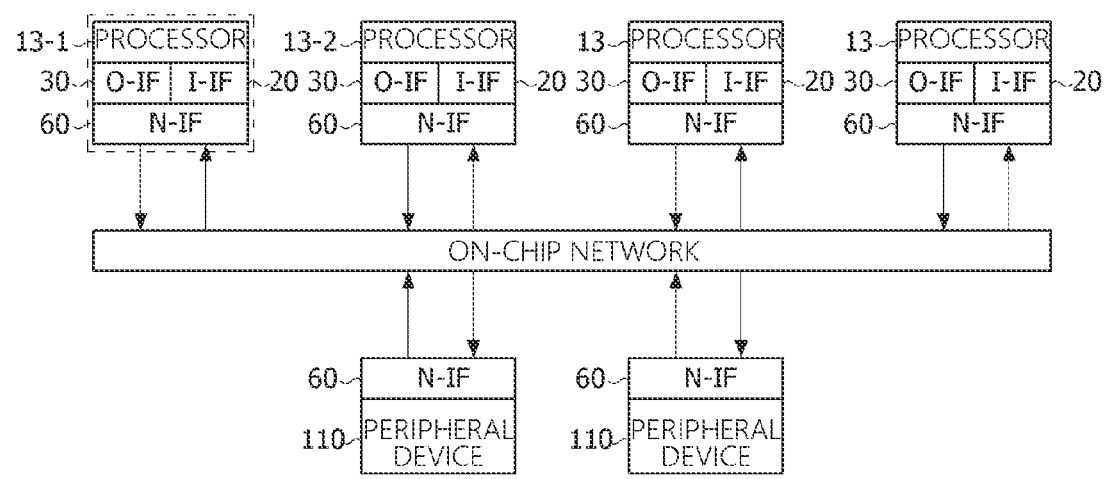

FIG. 13 is a diagram for describing an operation of an interrupt request processing device according to an embodiment. Referring to FIG. 13, when an IRQ signal is a non-designated IRQ signal, a dedicated processor 13-1 (marked with a dotted box) for processing the non-designated IRQ signal among a plurality of processors 13 may be designated in advance according to a non-designated dedicated interrupt signal processing device method, and a packet may be transmitted. That is, some of the plurality of processors 13 may be designated in advance as the processor 13-1 dedicated to the non-designated IRQ signal.

In this case, an I-IF of the dedicated processor 13-1 may include an interrupt status register file and an interrupt queue which have relatively larger capacity compared to the I-IF of the not-designated processor 13, and a buffer.

The peripheral device 11 transmits a packet of a designated IRQ signal to a corresponding processor 13 according to the processor ID and transmits a packet of a non-designated IRQ signal to the designated dedicated processor 13-1. The above method may affect performance of the system depending on an appropriate load balancing policy of the operating system. Since the dedicated processor 13-1 has to process the interrupt request preferentially, the operating system may minimize the number of allocated tasks to the dedicated processor 13-1. Further, the I-IF of the dedicated processor 13-1 may transmit some packets to another dedicated processor 13-2 according to a predetermined policy when interrupt requests are accumulated more than a certain limit in a queue of the interrupt queue. That is, the plurality of processors 13-1 and 13-2 may be designated exclusively and the priority may be set, and when the non-designated IRQ signals are accumulated, the non-designated IRQ signals may be allocated according to the priority.

Figure 14:
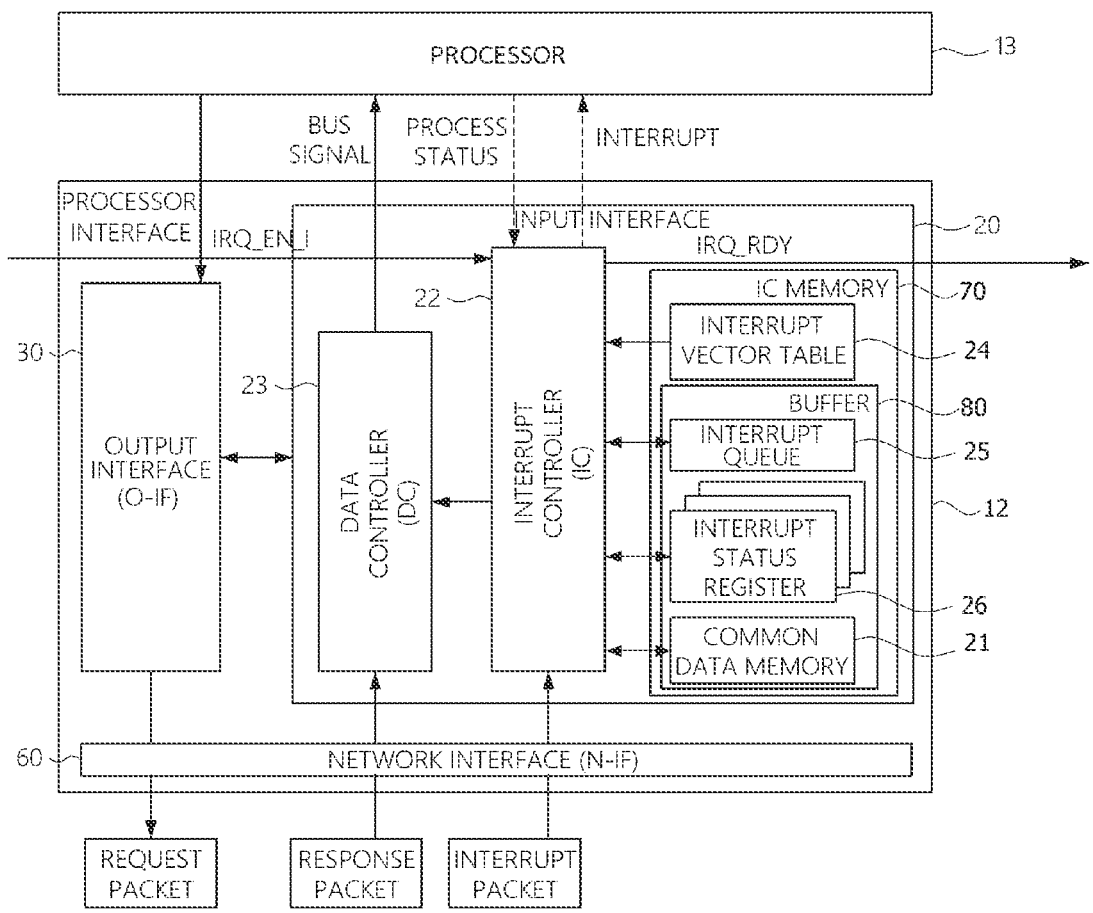
Figure 14:
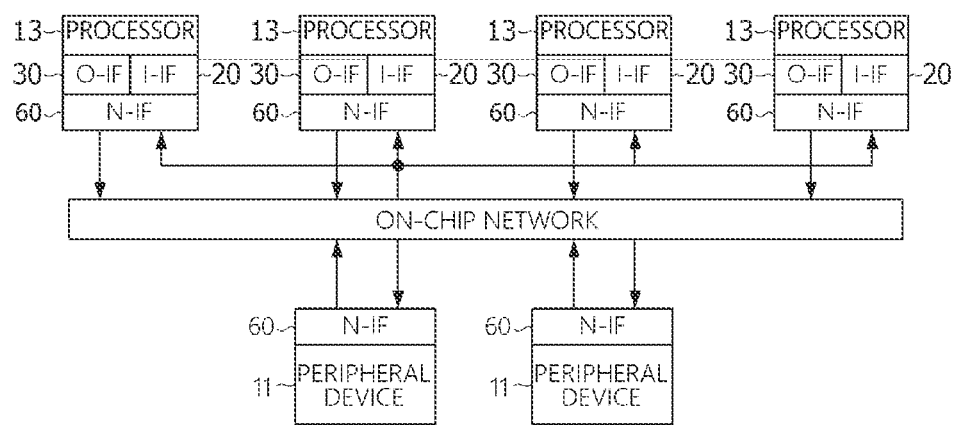

FIG. 14 is a diagram for describing an operation of an interrupt request processing device according to an embodiment. Referring to FIG. 14, when an IRQ signal is a non-designated IRQ signal, an interrupt packet may be transmitted to all processor interfaces 12 according to a daisy chain method, and each of the processor interfaces 12 may sequentially determine whether the non-designated IRQ signal is processed using an enable signal (IRQ_EN) received from a processor interface 12 located at a front end.

The I-IFs 20 of the processor interfaces 12 are not independently connected to an on-chip network and are connected through one port so that a packet generated by the peripheral device 11 may be simultaneously transmitted to the I-IFs 20 of all of the processor interfaces 12.

The I-IF 20 of each processor interface 12 may be connected in the daisy chain method to transmit an enable signal (IRQ_EN). The enable signal is sequentially transmitted starting from the I-IF 20 of the processor interface 12 located at a front end to the I-IF 20 of the processor interface 12 located at a rear end.

When a packet of a designated IRQ signal is input, each I-IF 20 may check a header of the packet and process the packet only when it is designated by itself.

When a packet of a non-designated IRQ signal is input, only one processor interface may be activated in response to the enable signal to process the packet.

When the I-IF 20 of each processor interface processes the interrupt by itself, the enable signal is deactivated, and when the I-IF 20 does not process the interrupt by itself, the enable signal is activated. When the enable signal is activated, the I-IF 20 of the processor interface located at the rear end must process the interrupt request.

Therefore, except for the last processor interface, it is possible to determine whether the non-designated IRQ signal is processed according to the status of the processor only when the enable signal is activated. The I-IF of the last processor interface located at the rearmost end processes the non-designated IRQ signal unconditionally when the enable signal is activated.

The above method has an advantage in that only one enable signal line is added between the I-IFs 20 so that the IRQ may be processed by reflecting the status of the processor and the processor interface. However, since the plurality of I-IFs 20 of the processor interfaces may receive only one packet at once, a latency may be generated when multiple IRQ signals are generated at the same time, but such a situation does not occur frequently, and thus actual performance reduction is negligible.

All of the non-designated interrupt processing methods described with reference to FIGS. 11 to 14 may be applicable to the designated interrupt processing method.

Terms described in the specification such as "unit" refer to software or a hardware component such as a field-programmable gate array (FPGA) or an Application-Specific Integrated Circuit (ASIC), and the unit performs certain functions. However, the "unit" is not limited to software or hardware. The "unit" may be configured in a storage medium that may be addressed or may be configured to be executed by at least one processor. Therefore, examples of the "unit" include components such as software components, object-oriented software components, class components and task components, and processes, functions, attributes, procedures, subroutines, segments of program codes, drivers, firmware, micro codes, circuits, data, database, data structures, tables, arrays, and variables. Components and functions provided from "units" may be combined into a smaller number of components and "units" or may be further separated into additional components and "units." In addition, the components and the "units" may be implemented to playback one or more CPUs in a device or a secure multimedia card.

In the interrupt request processing device of the present invention, complex interrupt signal processing for a multiprocessor can be simplified and efficiency can be increased.

Further, interrupt request transmission based on a message can be performed.

Further, interrupt request processing based on an on-chip network can be performed.

Further, interrupt request can be processed without a separate interrupt connection lines.

Further, in processing an interrupt request, network access can be minimized.

Further, it is possible to reduce overhead due to network access.

Further, it is compatible with the conventional processor structure.

While the example embodiments of the present invention and their advantages have been described above in detail, it should be understood by those skilled in the art that various changes, substitutions and alterations may be made herein without departing from the scope of the invention as defined by the following claims.

REFERENCE NUMERALS

10: INTERRUPT REQUEST PROCESSING DEVICE
11: PERIPHERAL DEVICE
12: PROCESSOR INTERFACE
13: PROCESSOR
14: MEMORY

What is claimed is:
1. An interrupt request processing device comprising:
one or more peripheral devices;
one or more processor interfaces including a network interface; and
one or more processors,
wherein, when an interrupt request (IRQ) is generated, the peripheral device generates a packet including a peripheral device identification (ID) and a task ID and transmits the packet to the processor interface via an on-chip network,
the processor interface receives and decodes the packet to transmit the IRQ signal to the processor and receives an interrupt vector generated from the processor to transmit an instruction and data corresponding to an activated interrupt request from an interrupt controller (IC) memory inside a processor interface to the processor,
the processor outputs the interrupt vector in response to the IRQ signal and executes a corresponding interrupt service routine (ISR),
the processor receives initial instructions and data from the processor interface via internal communication thereof and the peripheral device and the processor interface perform data communication via the on-chip network, and
the processor interface includes an output interface which intercepts the interrupt vector generated by the processor in response to the IRQ signal, and an input interface which receives the interrupt vector from an output interface and then transmits an initial instruction corresponding to a currently activated interrupt signal to the processor using the peripheral device ID and the task ID of the packet stored inside the processor interface.

2. The interrupt request processing device of claim 1, wherein the packet includes interrupt status information and data, and
the interrupt status information includes the peripheral device ID (DID), a priority (PR), the task ID (TID), and the number (NAD) of pieces of attached data.

3. The interrupt request processing device of claim 1, wherein the processor interface includes:
the input interface including the buffer which stores the decoded packet, the IC which receives and decodes the packet and generates the initial instructions using an interrupt vector table and information included in the packet, and a data controller which performs data transmission with the processor;
the output interface which receives the interrupt vector from the processor to transmit the interrupt vector to the input interface and transmits a request packet to the peripheral device; and
the network interface in charge of connection with the on-chip network.

4. The interrupt request processing device of claim 1, wherein, when the interrupt request is generated, the peripheral device generates the packet using a designated processor ID to transmit the packet to the processor via the on-chip network,
the processor interface receives the packet and the processor performs an operation corresponding to the interrupt request, and
when the interrupt request is a non-designated IRQ, the interrupt request processing device designates the processor for processing the non-designated IRQ using at least one of an interrupt signal processing designation method, a global interrupt distributor method, a non-designated dedicated interrupt signal processing device method, and a daisy chain method of the peripheral device.

5. The interrupt request processing device of claim 4, wherein, in the interrupt signal processing designation method of the peripheral device, the peripheral device arbitrarily designates the processor connected to the on-chip network and generates and transmits the packet using the designated processor ID.

6. The interrupt request processing device of claim 5, wherein, as a frequency of occurrence of the IRQ increases, the peripheral device arbitrarily designates one of the one or more processors and generates and transmits the packet to the designated processor, and the processor that is designated each time the IRQ is generated is changed.

7. The interrupt request processing device of claim 4, wherein, when the IRQ is the non-designated IRQ, the interrupt request processing device designates the processor for processing the non-designated IRQ in consideration of a periodically measured load of the processor and a number of waiting IRQ in the processor interface.

8. The interrupt request processing device of claim 4, further comprising a global interrupt distributor which receives the packet from the peripheral device via the on-chip network and is connected to the one or more processors to designate a processor for processing the IRQ.

9. The interrupt request processing device of claim 8, wherein, in the global interrupt distributor method, the global interrupt distributor receives a ready signal from the plurality of processors, designates the processor for processing the IRQ in response to the ready signal, and transmits an interrupt request packet to the corresponding processor; the ready signal includes the information of availability and workload of the processor and a number of waiting IRQ in the processor interface.

10. The interrupt request processing device of claim 9, wherein the global interrupt distributor and the processor are connected via the on-chip network or an interrupt packet bus so that the global interrupt distributor transmits the packet to the designated processor via the on-chip network or the interrupt packet bus.

11. The interrupt request processing device of claim 4, wherein, in the non-designated dedicated interrupt request processing device method, the dedicated processor for dedicatedly processing the non-designated IRQ signal among the one or more processors is designated in advance and the packet is transmitted.

12. The interrupt request processing device of claim 11, wherein the dedicated processor is provided as a plurality of dedicated processors and the plurality of dedicated processors are designated according to a priority, and when the non-designated IRQ is accumulated, the non-designated IRQ is allocated according to the priority.

13. The interrupt request processing device of claim 4, wherein, in the daisy chain method, an interrupt packet is transmitted to all of the one or more processor interfaces, and each processor interface sequentially determines whether the non-designated IRQ is processed using an enable signal received from the processor interface located at a front end.

14. The interrupt request processing device of claim 1, wherein the peripheral device with a slave interface only generates the IRQ packet and transmits the IRQ signal to the processor interface,
the IC in the processor interface accesses the peripheral device through a master interface, fetches the packet corresponding to the IRQ signal, decodes and stores the packet, and transmits the IRQ signal to the processor,
the processor interface receives the interrupt vector generated from the processor and transmits the initial instruction corresponding to the activated interrupt request to the processor, and
the processor outputs the interrupt vector in response to the IRQ signal, and executes the corresponding.

15. The interrupt request processing device of claim 14, wherein, when there is an interrupt waiting, the processor interface accesses the peripheral device during an interrupt waiting time and fetches the packet corresponding to the IRQ signal in advance.

* * * * *